United States Patent
Jacobson et al.

(10) Patent No.: US 9,602,276 B2
(45) Date of Patent: Mar. 21, 2017

(54) METHOD AND APPARATUS FOR VIRTUAL PAIRING WITH A GROUP OF SEMI-CONNECTED DEVICES

(75) Inventors: David M. Jacobson, San Diego, CA (US); Lu Xiao, San Diego, CA (US); David J. Julian, San Diego, CA (US); Zhanfeng Jia, Belmont, CA (US); Brian M. Buesker, San Diego, CA (US); Vito R. Bica, Poway, CA (US); Edward H. Teague, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 446 days.

(21) Appl. No.: 13/157,048

(22) Filed: Jun. 9, 2011

(65) Prior Publication Data
US 2011/0305333 A1 Dec. 15, 2011

Related U.S. Application Data

(60) Provisional application No. 61/354,135, filed on Jun. 11, 2010.

(51) Int. Cl.
*H04L 9/08* (2006.01)
*H04L 9/32* (2006.01)
*H04W 12/04* (2009.01)

(52) U.S. Cl.
CPC .......... *H04L 9/0833* (2013.01); *H04L 9/0844* (2013.01); *H04L 9/3213* (2013.01);
(Continued)

(58) Field of Classification Search
None
See application file for complete search history.

(56) References Cited

U.S. PATENT DOCUMENTS 7,843,830 B1 * 11/2010 Subramanian ........ H04L 1/1887
370/229
7,936,878 B2    5/2011 Kune et al.
(Continued)

FOREIGN PATENT DOCUMENTS

EP          2271143 A1    1/2011
JP       2009542118 A    11/2009
(Continued)

OTHER PUBLICATIONS

International Search Report and Written Opinion—PCT/US2011/040099—ISA/EPO—Jun. 1, 2012.
(Continued)

*Primary Examiner* — Azizul Choudhury
(74) *Attorney, Agent, or Firm* — Won Tae C. Kim

(57) ABSTRACT

One feature provides a method for a client node to establish a session key with a group node by obtaining an epoch identity value associated with a current epoch, wherein obtaining the epoch identity value includes one of computing the epoch identity value based on a node real time or negotiating the epoch identity value with the group node, computing a restricted key using a shared secret key, the epoch identity value, and a group node identity associated with the group node, and executing a session key establishment protocol with the group node to derive the session key using the restricted key as a master key in the session key establishment protocol. The session key may be established between the group node and the client node even though communications between the group node and the central node is only intermittently available during the current epoch.

50 Claims, 24 Drawing Sheets

(52) U.S. Cl.
CPC .......... *H04L 9/3297* (2013.01); *H04W 12/04* (2013.01); *H04L 2209/76* (2013.01); *H04L 2209/80* (2013.01)

(56) References Cited

U.S. PATENT DOCUMENTS

| | | |
|---|---|---|
| 8,194,859 B2 * | 6/2012 | Wingert et al. ............... 380/286 |
| 2004/0203357 A1 | 10/2004 | Nassimi |
| 2007/0206799 A1 * | 9/2007 | Wingert et al. ............... 380/285 |
| 2008/0037791 A1 * | 2/2008 | Jakobsson .................... 380/278 |
| 2010/0220856 A1 * | 9/2010 | Kruys et al. .................... 380/44 |
| 2010/0246824 A1 | 9/2010 | Xiao et al. |
| 2010/0296655 A1 | 11/2010 | Solow et al. |
| 2010/0329463 A1 | 12/2010 | Ratliff et al. |
| 2011/0078443 A1 | 3/2011 | Greenstein et al. |
| 2011/0078445 A1 | 3/2011 | Xiao et al. |

FOREIGN PATENT DOCUMENTS

| | | |
|---|---|---|
| JP | 2010045692 A | 2/2010 |
| WO | 2010041164 A2 | 4/2010 |

OTHER PUBLICATIONS

Xiao et al: "A survey of key management schemes in wireless sensor networks", Computer Communications, Elsevier Science Publishers BV, Amsterdam, NL, vol . 30, No. 11-12, Aug. 24, 2007 (Aug. 24, 2007), pp. 2314-2341, XP022211038, ISSN: 0140-3664, DOI: 10.1016/J.COMCOM.2007.04.009.

* cited by examiner

*OPERATION OF A CLIENT NODE FOR ESTABLISHING A SESSION KEY WITH A GROUP NODE*

*OPERATION OF A CLIENT NODE USING REAL TIME TO DEFINE EPOCHS*

OPERATION OF A CLIENT NODE WITHOUT USING REAL TIME TO DEFINE EPOCHS, CLIENT NODE INITIATED

*OPERATION OF A CLIENT NODE WITHOUT USING REAL TIME TO DEFINE EPOCHS, GROUP NODE INITIATED*

*OPERATION OF A GROUP NODE FOR ESTABLISHING A SESSION KEY WITH A CLIENT NODE*

OPERATION OF A GROUP NODE RELATIVE TO A
CENTRAL NODE USING REAL TIME TO DEFINE EPOCHS

*OPERATION OF A GROUP NODE USING REAL TIME TO DEFINE EPOCHS*

*OPERATION OF A GROUP NODE RELATIVE TO CENTRAL NODE WITHOUT USING REAL TIME TO DEFINE EPOCHS*

*OPERATION OF A GROUP NODE WITHOUT USING REAL TIME TO DEFINE EPOCHS*

OPERATION OF A CENTRAL NODE FOR ESTABLISHING A COMMUNICATION SESSION BETWEEN A FIRST GROUP NODE AND A CLIENT NODE

*OPERATION OF A CENTRAL NODE USING REAL TIME TO DEFINE EPOCHS*

*OPERATION OF A CENTRAL NODE WITHOUT USING REAL TIME TO DEFINE EPOCHS*

METHOD AND APPARATUS FOR VIRTUAL PAIRING WITH A GROUP OF SEMI-CONNECTED DEVICES

CLAIM OF PRIORITY

The present application for patent claims priority to U.S. Provisional Patent Application No. 61/354,135 entitled "Method and Apparatus for Virtual Pairing with a Group of Semi-Connected Devices" filed Jun. 11, 2010, the entire disclosure of which is hereby expressly incorporated by reference herein.

BACKGROUND

Field

One feature relates to communication systems, and more particularly, to an improved method for establishing a session key between a client node and a group node without requiring per-session communication between the group node and a central node.

Background

Short range devices, such as short range client nodes, use a pairing process to establish shared keys that can be used for encryption and authentication. This process usually involves public key cryptographic operations, which consume many central processing unit (CPU) cycles and thus a significant amount of electrical energy. Many such devices are battery powered, thus frequent pairing can reduce the time until the battery needs recharging. To avoid frequent pairing operations, a scheme may be used that allows a "virtual pairing" of devices.

In virtual pairing, client nodes pair with the central node via one of the group nodes. It is assumed that there is one central node, with ample computational power, storage, and physical security, and some number of "group nodes" that are in communication with the central node. The group nodes may be portable (e.g., battery powered with cellphone battery energy), and/or semi-portable (e.g., desk top computer on a cart), and not physically secure. The client nodes may be very small devices powered by small batteries, for example, small button cells. The client nodes can communicate directly with at least one group node, but perhaps not all group nodes, and cannot communicate directly with the central node.

In one example, the above described structure may be used in a hospital where the central node might be part of the information technology (IT) infrastructure and located in a secure location. A group node might be on a counter in a nursing station or may be a portable battery-powered device carried by a nurse or lab technician. The client nodes may be patient tags.

In short, virtual pairing is the process of the client node establishing a master key, shared with the central node, but communicating with the central node indirectly via one of the group nodes. Then, as needed, the client nodes can establish a session key with any group node. This protocol for establishing a session key involves the group node communicating with the central node.

During the protocol to establish a session key, the group node communicates with the central node. However, there may be anticipated usage issues where such communication might be only intermittently available, or have very limited bandwidth. As a result, there is a need for an apparatus and method that can allow session key establishment between a client node and a group node without requiring per-session communication between the group node and the central node. Additionally, there is a need for a system in which lost, stolen, compromised, decommissioned, and/or faulty group nodes can be isolated from the system in a way that is simple and substantially passive. For example, a node does not have to be trusted to obey a message and in a substantially passive system there is no need for a technician to physically go to a node to destroy, delete and/or replace a key.

SUMMARY

In one feature, a method operational at a client node for establishing a session key between the client node and a group node is disclosed, the method comprising: obtaining an epoch identity value associated with a current epoch, wherein obtaining the epoch identity value includes one of computing the epoch identity value based on a node real time or negotiating the epoch identity value with the group node; computing a restricted key using a shared secret key, the epoch identity value, and a group node identity associated with the group node, the shared secret key known to the client node and a central node; and executing a session key establishment protocol with the group node to derive the session key using the restricted key as a master key in the session key establishment protocol.

In one embodiment, the method may further comprise: loosely synchronizing time between the client node, the group node, and the central node, and wherein obtaining the epoch identity value associated with the current epoch includes receiving a group node real time and the group node identity from the group node, comparing the group node real time with a client node real time, determining that the group node real time is within a maximum time threshold difference of the client node real time, and computing the epoch identity value from the node real time. In another embodiment, obtaining the epoch identity value associated with the current epoch includes: receiving a group node epoch value and the group node identity from the group node; comparing the group node epoch value to a client node epoch value, the client node epoch value equal to a last known epoch identity value used in a last successfully established session with any group node; computing the epoch identity value as the larger of the group node epoch value and the client node epoch value; and transmitting the computed epoch identity value to the group node.

In another embodiment, obtaining the epoch identity value associated with the current epoch includes: transmitting a client node epoch value to the group node, the client node epoch value equal to a last known epoch identity value used in a last successfully established session with any group node; receiving the epoch identity value and the group node identity from the group node; and verifying that the received epoch identity value is equal to or greater than the client node epoch value transmitted. In one embodiment, the method further comprises verifying the session key using a key verification protocol. In another embodiment, a communications link between the group node and the central node is only intermittently available during the current epoch. In one embodiment, the restricted key is epoch specific and group node specific. In another embodiment, the restricted key is provided to the group node by the central node. In yet another embodiment, the central node maintains a list of uncompromised group nodes and wherein a compromised group node is removed from the list. In yet another embodiment, the restricted key is used multiple times during the current epoch to derive a plurality of session keys.

In yet another embodiment, the current epoch is of an unfixed duration and expires upon the start of a new epoch.

In yet another embodiment, the epoch identity value is a sequential integer generated by the central node and is incremented upon the start of the new epoch by the central node. In yet another embodiment, the central node indicates a start of the current epoch by transmitting a commit message to the group node. In yet another embodiment, the epoch is derived from real time. In yet another embodiment, computing the restricted key using the shared secret key, the epoch identity value, and the group node identity is performed using one of a cipher-based message authentication code (CMAC) function, a hash-based message authentication code (HMAC) function, or a cipher block chaining message authentication code (CBC-MAC) function. In yet another embodiment, the method further comprises inserting a tuple into a cache to avoid derivation of the restricted key for each session created with the group node during the current epoch. In yet another embodiment, the tuple comprises the group node identity and the restricted key. In yet another embodiment, the cache is flushed when the current epoch expires.

In another feature a client node is disclosed, comprising: a communication interface adapted to communicate with a group node; and a processing circuit communicatively coupled to the communication interface, the processing circuit adapted to obtain an epoch identity value associated with a current epoch, wherein obtaining the epoch identity value includes one of computing the epoch identity value based on a node real time or negotiating the epoch identity value with the group node, compute a restricted key using a shared secret key, the epoch identity value, and a group node identity associated with the group node, the shared secret key known to the client node and a central node, and execute a session key establishment protocol with the group node to derive a session key using the restricted key as a master key in the session key establishment protocol. In one embodiment, the processing circuit is further adapted to loosely synchronize time between the client node, the group node, and the central node, and wherein said obtain the epoch identity value associated with the current epoch causes the processing circuit to: receive a group node real time and the group node identity from the group node; compare the group node real time with a client node real time; determine that the group node real time is within a maximum time threshold difference of the client node real time; and compute the epoch identity value from the node real time.

In another embodiment, said obtain the epoch identity value associated with the current epoch causes the processing circuit to: receive a group node epoch value and the group node identity from the group node; compare the group node epoch value to a client node epoch value, the client node epoch value equal to a last known epoch identity value used in a last successfully established session with any group node; compute the epoch identity value as the larger of the group node epoch value and the client node epoch value; and transmit the computed epoch identity value to the group node. In yet another embodiment, said obtain the epoch identity value associated with the current epoch causes the processing circuit to: transmit a client node epoch value to the group node, the client node epoch value equal to a last known epoch identity value used in a last successfully established session with any group node; receive the epoch identity value and the group node identity from the group node; and verify that the received epoch identity value is equal to or greater than the client node epoch value transmitted.

In another feature a client node is disclosed, comprising: means for obtaining an epoch identity value associated with a current epoch, wherein obtaining the epoch identity value includes one of computing the epoch identity value based on a node real time or negotiating the epoch identity value with the group node; means for computing a restricted key using a shared secret key, the epoch identity value, and a group node identity associated with a group node, the shared secret key known to the client node and a central node; and executing a session key establishment protocol with the group node to derive a session key using the restricted key as a master key in the session key establishment protocol. In one embodiment, the client node further comprises: means for loosely synchronizing time between the client node, the group node, and the central node, and wherein means for obtaining the epoch identity value associated with the current epoch includes means for receiving a group node real time and the group node identity from the group node, means for comparing the group node real time with a client node real time, means for determining that the group node real time is within a maximum time threshold difference of the client node real time, and means for computing the epoch identity value from the node real time.

In another embodiment, the means for obtaining the epoch identity value associated with the current epoch includes: means for receiving a group node epoch value and the group node identity from the group node; means for comparing the group node epoch value to a client node epoch value, the client node epoch value equal to a last known epoch identity value used in a last successfully established session with any group node; means for computing the epoch identity value as the larger of the group node epoch value and the client node epoch value; and means for transmitting the computed epoch identity value to the group node.

In another embodiment, the means for obtaining the epoch identity value associated with the current epoch includes: means for transmitting a client node epoch value to the group node, the client node epoch value equal to a last known epoch identity value used in a last successfully established session with any group node; means for receiving the epoch identity value and the group node identity from the group node; and means for verifying that the received epoch identity value is equal to or greater than the client node epoch value transmitted.

In another feature, a processor readable medium having one or more instructions operational at a client node for establishing a session key between the client node and a group node is provided, which when executed by at least one processor causes the processor to: obtain an epoch identity value associated with a current epoch, wherein obtaining the epoch identity value includes one of computing the epoch identity value based on a node real time or negotiating the epoch identity value with the group node; compute a restricted key using a shared secret key, the epoch identity value, and a group node identity associated with the group node, the shared secret key known to the client node and a central node; and execute a session key establishment protocol with the group node to derive the session key using the restricted key as a master key in the session key establishment protocol. In one embodiment, there are additional instructions which when executed by the processor further causes the processor to: loosely synchronize time between the client node, the group node, and the central node, and wherein obtaining the epoch identity value associated with the current epoch includes receiving a group node real time and the group node identity from the group node, comparing the group node real time with a client node real time, determining that the group node real time is within a maximum time threshold difference of the client node real time, and computing the epoch identity value from the node real time.

In another embodiment, obtaining the epoch identity value associated with the current epoch includes: receiving a group node epoch value and the group node identity from the group node; comparing the group node epoch value to a client node epoch value, the client node epoch value equal to a last known epoch identity value used in a last successfully established session with any group node; computing the epoch identity value as the larger of the group node epoch value and the client node epoch value; and transmitting the computed epoch identity value to the group node. In yet another embodiment, obtaining the epoch identity value associated with the current epoch includes: transmitting a client node epoch value to the group node, the client node epoch value equal to a last known epoch identity value used in a last successfully established session with any group node; receiving the epoch identity value and the group node identity from the group node; and verifying that the received epoch identity value is equal to or greater than the client node epoch value transmitted.

In another feature a method operational at a group node for establishing a session key between the group node and a client node is disclosed, the method comprising: receiving a first set of proxy tokens associated with an epoch from a central node, the first set of proxy tokens including a proxy token associated with the client node, the proxy token having a client node identity and a restricted key; storing the first set of proxy tokens as a reserve set of proxy tokens; replacing an active set of proxy tokens with the reserve set of proxy tokens upon a beginning of the epoch, the reserve set of proxy tokens becoming a next active set of proxy tokens; and executing a session key establishment protocol with the client node to derive the session key using the restricted key as a master key in the session key establishment protocol.

In one embodiment, the method further comprises: obtaining an epoch identity value associated with the epoch; and retrieving the restricted key based on the epoch identity value. In one embodiment, obtaining the epoch identity value associated with the epoch includes: receiving a client node real time; comparing the client node real time to a group node real time; determining that the group node real time is within a maximum time threshold difference of the client node real time; and computing the epoch identity value based on a node real time. In another embodiment, retrieving the restricted key based on the epoch identity value further includes: determining whether the reserve set of proxy tokens or the active set of proxy tokens corresponds to the epoch identity value; obtaining the restricted key from the reserve set of proxy tokens if the reserve set of proxy tokens are associated with the epoch identity value; and obtaining the restricted key from the set of proxy tokens if the reserve set of proxy tokens are associated with the epoch identity value.

In another embodiment, the method further comprises: loosely synchronizing time between the central node, the group node, and the client node; obtaining an epoch identity value associated with a current time; and selecting the restricted key for the client node from the first set of proxy tokens based on the epoch identity value and the client node identity. In another embodiment, the method further comprises: receiving at least one message from the central node that includes an epoch identity value associated with the epoch, and the first set of proxy tokens; and receiving a commit message from the central node indicating the beginning of the epoch. In another embodiment, a communications link between the group node and the central node is only intermittently available during the epoch.

In another feature, a group node is provided, comprising: a first communication interface adapted to communicate with a central node; a second communication interface adapted to communication with a client node; and a processing circuit communicatively coupled to the first and second communication interfaces, the processing circuit adapted to receive a first set of proxy tokens associated with an epoch from the central node, the first set of proxy tokens including a proxy token associated with the client node, the proxy token having a client node identity and a restricted key, store the first set of proxy tokens as a reserve set of proxy tokens, replace an active set of proxy tokens with the reserve set of proxy tokens upon a beginning of the epoch, the reserve set of proxy tokens becoming a next active set of proxy tokens, and execute a session key establishment protocol with the client node to derive a session key using the restricted key as a master key in the session key establishment protocol.

In another feature, a group node is disclosed, comprising: means for receiving a first set of proxy tokens associated with an epoch from a central node, the first set of proxy tokens including a proxy token associated with a client node, the proxy token having a client node identity and a restricted key; means for storing the first set of proxy tokens as a reserve set of proxy tokens; means for replacing an active set of proxy tokens with the reserve set of proxy tokens upon a beginning of the epoch, the reserve set of proxy tokens becoming a next active set of proxy tokens; and means for executing a session key establishment protocol with the client node to derive a session key using the restricted key as a master key in the session key establishment protocol.

In another feature, a processor readable medium having one or more instructions operational at a group node for establishing a session key between the group node and a client node is disclosed, which when executed by at least one processor causes the processor to: receive a first set of proxy tokens associated with an epoch from a central node, the first set of proxy tokens including a proxy token associated with the client node, the proxy token having a client node identity and a restricted key; store the first set of proxy tokens as a reserve set of proxy tokens; replace an active set of proxy tokens with the reserve set of proxy tokens upon a beginning of the epoch, the reserve set of proxy tokens becoming a next active set of proxy tokens; and execute a session key establishment protocol with the client node to derive the session key using the restricted key as a master key in the session key establishment protocol.

In another feature, a method operational at a central node for establishing a communication session between a first group node and a client node is disclosed, the method comprising: determining that a second group node has been compromised, the first group node having a first group node identifier; removing the compromised second group node from a list of uncompromised group nodes, wherein the list of uncompromised group nodes is stored at the central node and includes the first group node; and transmitting a plurality of proxy tokens associated with an upcoming epoch to each uncompromised group node on the list of uncompromised group nodes, the plurality of proxy tokens including a first proxy token associated with the first group node and transmitted to the first group node, the first proxy token including a client node identity and a restricted key, the upcoming epoch associated with an upcoming epoch identity value, wherein the restricted key is computed from the upcoming epoch identity value, the first group node identifier, and a shared key previously established between the client node and the central node.

In one embodiment, the first proxy token is transmitted prior to a beginning of the upcoming epoch. In another embodiment, the method further comprises: transmitting a commit message to the first group node, the commit message indicating the beginning of the upcoming epoch.

In another feature, a central node for establishing a communication session between a first group node and a client node is disclosed, the central node comprising: a communication interface adapted to communicate with the first group node; and a processing circuit coupled to the communication interface and adapted to determine that a second group node has been compromised, the first group node having a first group node identifier, remove the compromised second group node from a list of uncompromised group nodes, wherein the list of uncompromised group nodes is stored at the central node and includes the first group node, and transmit a plurality of proxy tokens associated with an upcoming epoch to each uncompromised group node on the list of uncompromised group nodes, the plurality of proxy tokens including a first proxy token associated with the first group node and transmitted to the first group node, the first proxy token including a client node identity and a restricted key, the upcoming epoch associated with an upcoming epoch identity value, wherein the restricted key is computed from the upcoming epoch identity value, the first group node identifier, and a shared key previously established between the client node and the central node.

In another feature, a central node for establishing a communication session between a first group node and a client node is disclosed, the central node comprising: means for determining that a second group node has been compromised, the first group node having a first group node identifier; means for removing the compromised second group node from a list of uncompromised group nodes, wherein the list of uncompromised group nodes is stored at the central node and includes the first group node; and means for transmitting a plurality of proxy tokens associated with an upcoming epoch to each uncompromised group node on the list of uncompromised group nodes, the plurality of proxy tokens including a first proxy token associated with the first group node and transmitted to the first group node, the first proxy token including a client node identity and a restricted key, the upcoming epoch associated with an upcoming epoch identity value, wherein the restricted key is computed from the upcoming epoch identity value, the first group node identifier, and a shared key previously established between the client node and the central node.

In another feature, a processor readable medium having one or more instructions operational at a central node for establishing a communication session between a first group node and a client node is disclosed, which when executed by at least one processor causes the processor to: determine that a second group node has been compromised, the first group node having a first group node identifier; remove the compromised second group node from a list of uncompromised group nodes, wherein the list of uncompromised group nodes is stored at the central node and includes the first group node; and transmit a plurality of proxy tokens associated with an upcoming epoch to each uncompromised group node on the list of uncompromised group nodes, the plurality of proxy tokens including a first proxy token associated with the first group node and transmitted to the first group node, the first proxy token including a client node identity and a restricted key, the upcoming epoch associated with an upcoming epoch identity value, wherein the restricted key is computed from the upcoming epoch identity value, the first group node identifier, and a shared key previously established between the client node and the central node.

DETAILED DESCRIPTION

Figure 1:
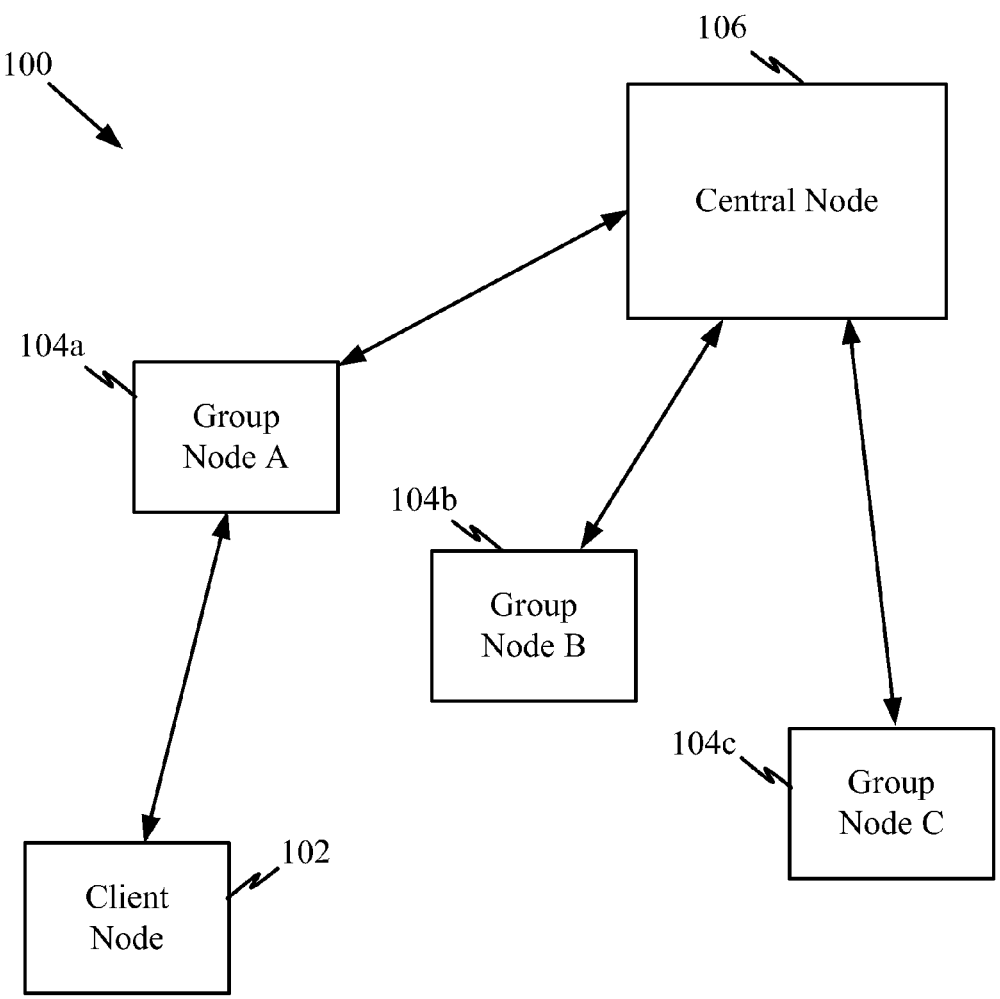
FIG. 1 illustrates a wireless network communication system.

In the following description, specific details are given to provide a thorough understanding of the embodiments. However, it will be understood by one of ordinary skill in the art that the embodiments may be practiced without these specific details. For example, operations may be shown in block diagrams, or not be shown at all, in order not to obscure the embodiments in unnecessary detail. In other instances, well-known operations, structures and techniques may not be shown in detail in order not to obscure the embodiments.

As used herein, a central node may also be referred to as, and include some or all of the functionality of, a server, an authentication server, and/or any other suitable device for providing services to client nodes. A client node may also be referred to as, and include some or all the functionality of, a user equipment (UE), a wireless or wired communication device, node, mobile terminal, a mobile station and/or any other suitable device for communicating over a network. The client node may be in communication with the central node via one or more group nodes in a set of group nodes. A semi-connected group node may be a group node that has an unreliable, slow or intermittent communication with the central node.

Overview

One feature provides a system, apparatus and method for establishing a session key between a client node and a group node without requiring per-session communication between the group node and a central node.

The client node may have previously communicated with at least one good group node that was at that time in communication with the central node and successfully executed a virtual pairing protocol. As a result, the client node and the central node may have a shared secret key $K_M$.

In one example, a mechanism may be provided by which all nodes and terminals can acquire loosely-synchronized real time, that is, within several seconds. In the system, time may be divided into epochs where the length of an epoch is fixed and may be, for example, on the order of a minute to a few days. For each epoch, the group node may communicate at least once with the central node. The central node may send each group node a list of tuples. Each tuple entry may include a client node identifier "Cnode_ID" that identifies each client node, and a restricted key $K_R$ associated with each client node identifier Cnode_ID. A client node identifier Cnode_ID together with its associated restricted key $K_R$ may be referred to as a "proxy token." Thus, during the start of an epoch the central node may transmit each group node a series of proxy tokens associated with different client nodes.

The restricted key $K_R$ may be dependent on an epoch value "Epoch_ID" and a group identity value "Gnode_ID." For example, $K_R$ may be computed by the following formula:

$$K_R = CMAC(K_M, Gnode\_ID \| Epoch\_ID)$$

where Gnode_ID may be the group node identity, Epoch_ID may be a value associated with the upcoming epoch, $K_M$ may be the shared secret key shared between the client node and central node, and CMAC may be the Cipher-based message authentication code (CMAC) algorithm.

The client node may obtain the epoch identity Epoch_ID and then compute the restricted key $K_R$ since it knows the group node identity Gnode_ID and the shared secret key $K_M$. It may then use a two-round session key establishment protocol that uses randomness provided by each party, to generate a short term session key using the restricted key $K_R$ as the master key in the computation. The session key establishment protocol may also provide key-verification.

If a group node is decommissioned, lost, stolen, becomes faulty, or is compromised, the central node may remove it from its list of uncompromised group nodes, and after the current epoch expires, the central node may no longer forward valid proxy tokens reflecting current epoch values. Thus, the affected group node will not have any valid proxy tokens, and therefore cannot establish sessions with client nodes.

The restricted key $K_R$ may be used many times during an epoch. To avoid deriving $K_R$ for each session during the same epoch period, the client node may maintain a cache (e.g., memory, memory circuits, etc.) with tuples, for example the group node identity, epoch identity and restricted key. As a result, battery power in the client node may be saved.

In one example, the client node may have access to secure loosely synchronized real time. During one epoch, the epoch identity Epoch_ID may have the same value. Memory can be saved by storing Epoch_ID globally (e.g., placing the group node identity Gnode_ID and the restricted key $K_R$ in the cache entries), and flushing the cache when the epoch changes.

Exemplary Network Operating Environment

FIG. 1 illustrates a wireless network communication system 100. In this example, a client node 102, a set of group nodes 104a-104c, and a central node 106 are illustrated, where the client node 102 may communicate with the central node 106 indirectly via one or more of the group nodes 104a-104c. The central node 106 may be a fixed station or server. The group nodes 104a-104c may be either portable, battery powered devices and/or stationary electronic devices. The client node 102 may be, for example, a small, inexpensive, low-power wireless device that contains a limited amount of memory and limited battery energy. The client node 102 may for example communicate to a group node 104a-104c through Bluetooth®, Bluetooth® Low Engery, WiFi, ZigBee®, near field communications, and/or other wireless communication methodologies.

As shown in FIG. 1, the client node 102 may communicate with a group node, such as Group Node A 104a. The client node 102 may execute a virtual pairing protocol over a wireless link to establish shared keys, for example session keys, that may be used for encryption and authentication of data. Once the client node 102 has established a shared key with one of the group nodes 104a-10c, for example, Group Node A 104a, the client node 102 may indirectly communication with the central node 106. Although three (3) group nodes are shown, this is by way of illustration only and more or fewer group nodes may be utilized in the communication system 100.

Exemplary Communication System

Figure 2:
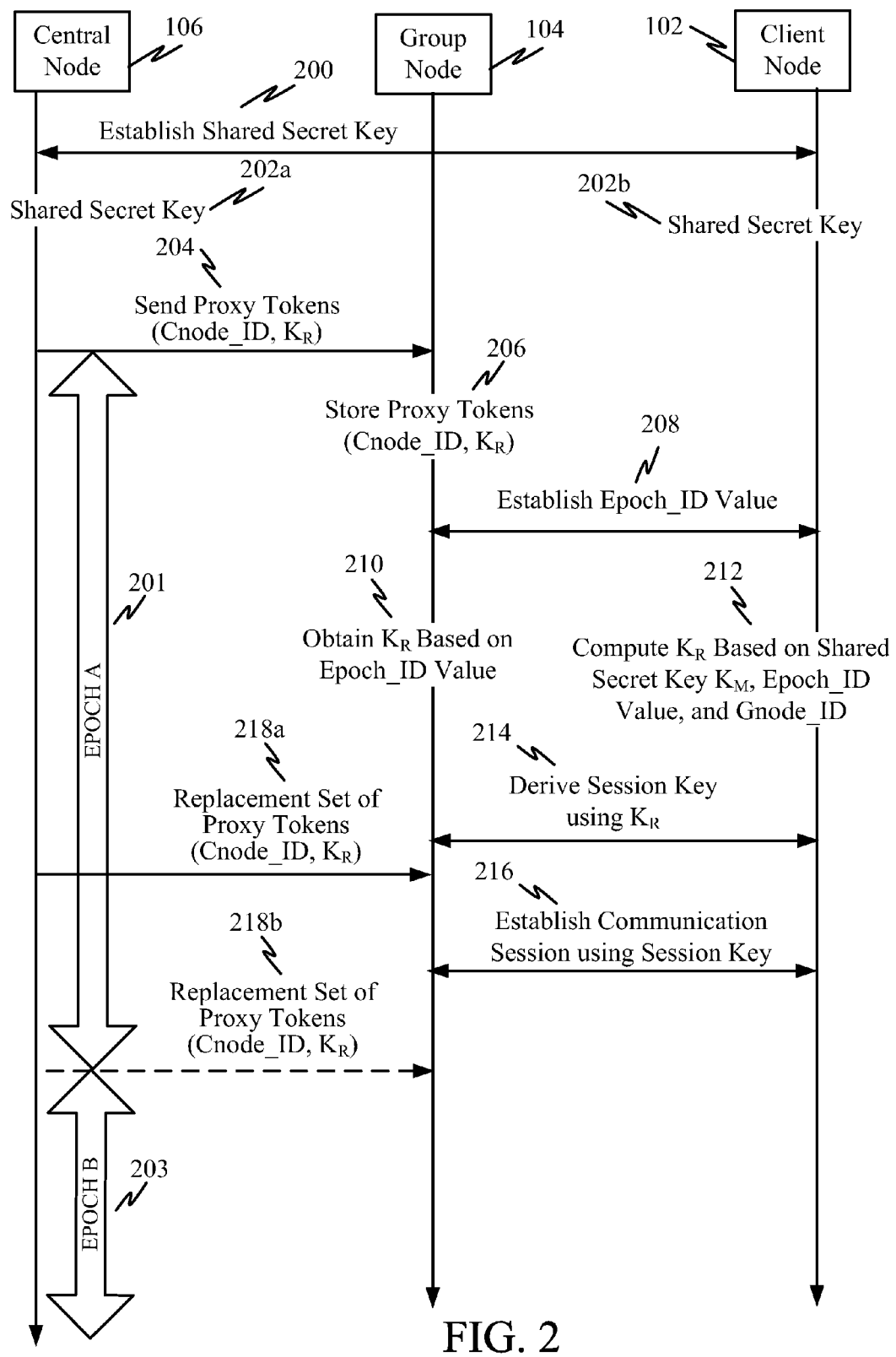
FIGS. 2 and 3 are flow diagrams illustrating examples of the operation of the communication system in which a session key is established between a client node and a group node without requiring per-session communication between the group node and a central node.

FIG. 2 is a flow diagram illustrating one example of the operation of the communication system 100 in which a session key is established between a client node 102 and a group node 104 without requiring per-session communication between the group node 104 and a central node 106. First, the central node 106 and the client node 102 may establish a shared secret key $K_M$ using the group node 104 as an intermediary 200. For example, the shared secret key $K_M$ may be established between the client node 102 and the central node 106 when the client node 102 joins the communication system 100. The shared secret key $K_M$ may be established using, for example, an elliptic curve Diffie-Hellman protocol so that the group node 104, which acts as an intermediary, does not have knowledge of value of the shared secret key. Once they shared secret key is established, the central node 106 may store the shared secret key $K_M$ 202a and the client node 102 may store the same key $K_M$ 202b. The central node 106 establishes a unique shared secret key with each client node in the system 100. In the preferred embodiment, the shared secret key $K_M$ is unknown to the group node 104. The shared secret key $K_M$ may be client node specific such that each client node in the communication system 100 shares a different secret key with the central node 106. The client node 102 may be associated with a client node identifier Cnode_ID.

Time within the communication system 100 may be divided into epochs, such as Epoch A 201 and Epoch B 203, where Epoch B 203 occurs after Epoch A 201 in time. The length of each epoch may be fixed and on the order of, for example, a few minutes to a few days. However, these are just examples. Epochs of different lengths may be chosen according to the requirements of the overall system.

For each epoch, the group node 104 may communicate at least once with the central node 106. For example, at the start of Epoch A (or in some embodiments prior to the start of Epoch A) the group node 104 may receive at least one proxy token 204 from the central node 106 for each client node 102. The proxy token received is associated with a particular epoch, for example Epoch A. Thus, for each client node in the communication system, the central node 106 may send a proxy token associated with an epoch to the group node 104 where the proxy token comprises a client identifier Cnode_ID and a restricted key $K_R$. The group node 104 may then store the one or more proxy tokens received 206 and associate each with a particular epoch. As such, each group node and client node pair in the communication system may have a unique restricted key $K_M$ pair. If a new client node enters the communication system in the middle of an epoch, the central node 106 may transmit a proxy token for the new client node to some or all group nodes 104a-104c.

In order for the client node 102 and the group node 104 to establish session keys, the client node 102 and group node 104 must first establish an acceptable epoch identity value Epoch_ID 208 that is to be used by both nodes. Once the client node 102 and the group node 104 have established the same Epoch_ID value, the group node 104 can obtain/retrieve the restricted key $K_R$ specifically associated with the epoch identity value Epoch_ID and the client identifier Cnode_ID it previously stored 210. Thus, for an Epoch_ID value corresponding to Epoch A 201, the group node 104 may retrieve the restricted key $K_R$ associated with Cnode_ID and Epoch A 201. Similarly, the client node 102 must obtain the restricted key $K_R$ based on the epoch identity value Epoch_ID. For example, the client node 102 may compute/calculate $K_R$ based on the formula:

$$K_R = CMAC(K_M, Gnode\_ID \| Epoch\_ID)$$

where Gnode_ID is the group node's 104 identity, Epoch_ID is the established epoch value, $K_M$ is the shared secret key shared between the client node 102 and central node 106, and CMAC is a Cipher-based message authentication code (CMAC) algorithm 212. However, generating the restricted key $K_R$ is not limited to the specific inputs and arguments shown in the formula above. For example, other operations that combine the inputs and arguments, and/or have suitable cryptographic properties may also be used, including but not limited to, Hash-based Message Authentication Code (HMAC), Cipher Block Chaining Message Authentication Code (CBC-MAC), hashing, or encryption. $K_M$ may be specific to the client node identifier Cnode_ID so as a result, the restricted key $K_R$ may be specific to the client node, the group node identity Gnode_ID, and the epoch identity Epoch_ID.

Next, a two-round session key establishment protocol 214 may be used to generate the session keys by using the restricted key $K_R$ as a master key along with random values (for example nonces) provided by both the client node 102 and the group node 104. In other words, the restricted key $K_R$ is used to derive the session keys used for communications between the two nodes. Note that the key $K_R$ is not directly transmitted between the client node 102 and the group node 104, but because it is known to both nodes, $K_R$ can be used to establish a session key between the two nodes. In this manner, a session key may be established between the client node 102 and the group node 104 to conduct a secure communications session 216.

Before the expiration of Epoch A 201, the central node 106 may transmit a replacement set of proxy tokens 218a for the next epoch, Epoch B 203. The replacement set of proxy tokens will similarly contain tuples identifying restricted keys $K_R$ for a given client node for the given epoch (Epoch B). By transmitting the proxy tokens before the beginning of Epoch B, the group node 104 has access to the set of tokens in case communication with the central node 106 is lost during the time when the epochs transition from Epoch A to Epoch B. In an alternative embodiment, the replacement set of proxy tokens associated with Epoch B may be transmitted at the start of Epoch B 218b. In yet other embodiments, a plurality of sets of proxy tokens may be provided to the group node 104 all at once, where each set of proxy tokens may be associated with a different epoch.

Since the central node 106 transmits the proxy tokens to the group node 104 before the group node 104 and the client node 102 commence session key establishment and the group node 104 holds said keys through the end of the epoch, establishing session keys between the group node 104 and the client node 102 may take place without requiring communication between the group node 104 and the central node 106 to occur throughout the rest of the epoch. For example, once the group node 104 acquires the proxy tokens for Epoch A at step 204, the group node 104 no longer needs to a communications link with the central node 106 (e.g., communications may be intermittent) for the rest of Epoch A in order to establish a session key with the client node 102. Thus, communications between the group node 104 and central node 106 during this period may be intermittent and/or unavailable. A group node having an intermittent communications link with the central node may be considered a "semi-connected" group node.

If a group node is decommissioned, lost, stolen, becomes faulty, or is compromised, the central node 106 may remove it from its list of uncompromised group nodes, and after the current epoch expires, the affected group node will not have any valid proxy tokens, and thus cannot establish secure communication sessions with client nodes.

The restricted key $K_R$ may be used many times during an epoch to generate various session keys between the group node 104 and client node 102. To avoid unnecessarily deriving the restricted key $K_R$ for each session with the group node 104 during the same epoch, the client node 102 may maintain a cache (e.g., memory, memory circuits, etc.) with tuples comprising, for example, the group node identity Gnode_ID, epoch identity value, and the associated restricted key. As a result, battery power in the client node 102 may be saved.

In one embodiment, when a new value or entry is to be inserted into the cache, the entry to be discarded from the cache may be selected. If the cache is a simple array, there may be only one choice: the one at the target location in the array is discarded. However, with a set-associative cache, the entry to be discarded may be chosen at random from the set (e.g., sub-array). Some data structures may be conducive to a least recently used replacement policy.

Exemplary Communication System—Epoch Identity Derivable from Real Time

Figure 3:
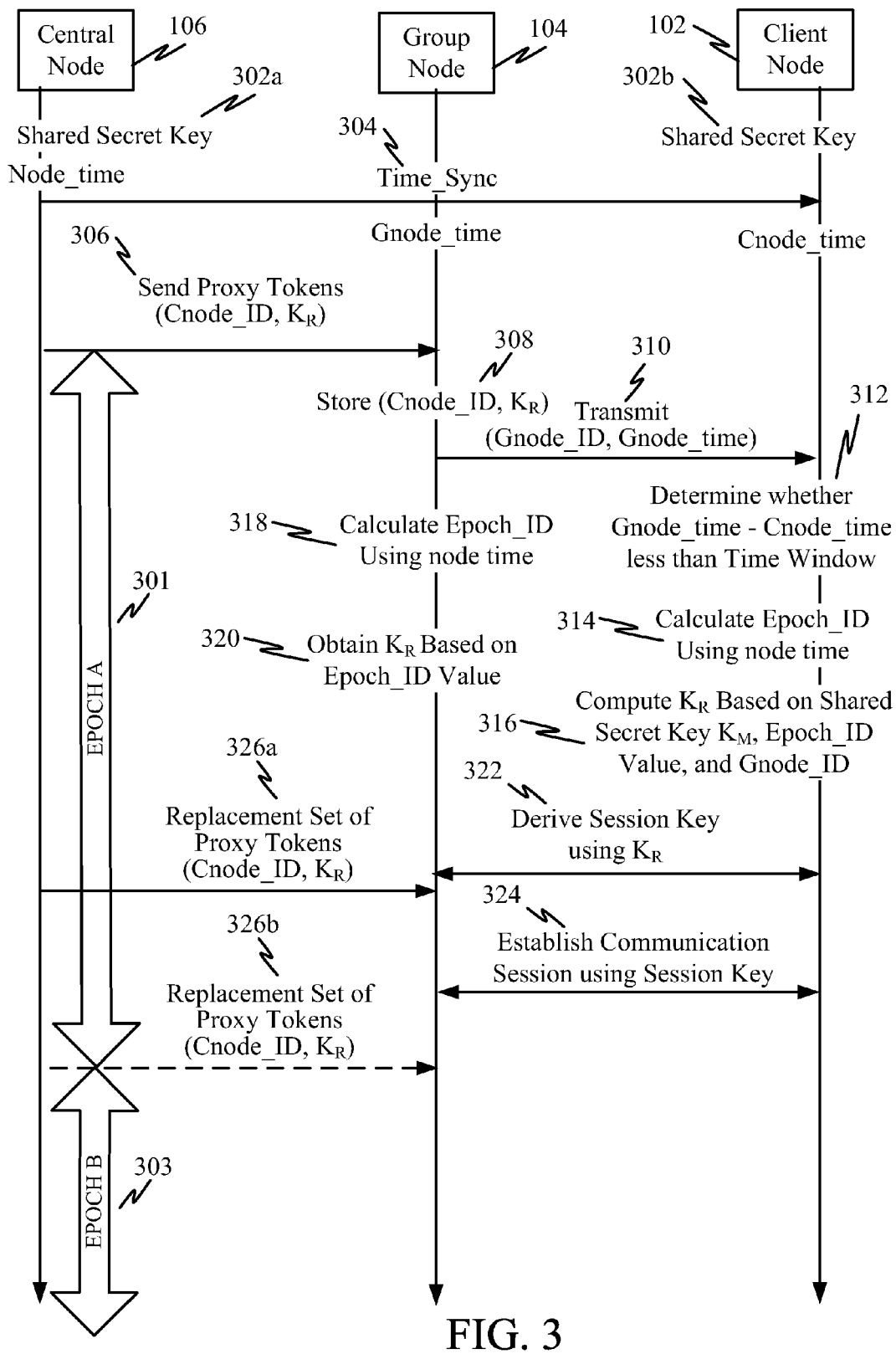

FIG. 3 is a flow diagram illustrating one example of the operation of the communication system 100 in which a session key is established between a client node 102 and a group node 104 without requiring per-session communication between the group node 104 and a central node 106. The central node 106 and the client node 102 may each have access to a shared secret key $K_M$ 302a, 302b, which may not be known to the group node 104. The shared secret key $K_M$ may be client node specific such that each client node in the communication system 100 shares a different secret key with the central node 106. The client node 102 may be associated with a client node identifier Cnode_ID.

In this example, a mechanism may be provided by which all nodes can acquire loosely-synchronized real time 304, for example, within several seconds of one another. For example, when a client node 102 first joins the communication system 100, the group node 104 may transmit real time information from the central node 106 to the client 102. Moreover, the client node's 102 real time may be updated or adjusted periodically. For example, at the start of every epoch, or some multiple of epoch, the group node may transmit real time information from the central node 106 to the client node 102. Thus, the time kept at the group node 104 may be identified as Gnode_time, and the time kept at the client node 102 may be identified as Cnode_time.

Time within the communication system 100 may be divided into epochs, such as Epoch A 301 and Epoch B 303, where Epoch B 303 occurs after Epoch A 301 in time. The length of each epoch may be fixed and on the order of, for example, a few minutes to a few days. However, these are just examples. Epochs of different lengths may be chosen according to the requirements of the overall system.

For each epoch, the group node 104 may communicate at least once with the central node 106. For example, at the start of Epoch A 301 (or in some embodiments prior to the start of Epoch A 301) the group node 104 may receive at least one proxy token 306 from the central node 106 for each client node 102. The proxy token received is associated with a particular epoch, for example Epoch A 301. Thus, for each client node in the communication system, the central node 106 may send a proxy token associated with an epoch to the group node 104 where the proxy token comprises a client identifier Cnode_ID and a restricted key $K_R$. The group node 104 may then store the one or more proxy tokens received 308 and associate each with a particular epoch. If a new client node enters the communication system in the middle of an epoch, the central node 106 may transmit a proxy token for the new client node to all group nodes 104a-104c.

Establishing the session key between the client node 102 and the group node 104 may begin when an initiating party (either the client node 102 or the group node 104) initiates the session key establishment protocol. For example, the group node 104 may transmit a message to the client node 102 that includes its identity Gnode_ID and its current real time Gnode_time 310. The client node 102 may then determine whether the group node's 104 real time Gnode_time is within a pre-determined time difference (e.g., time window, time threshold, maximum time threshold difference etc.) relative to its own real time Cnode_time, for example within several seconds 312. If the time difference between the two values is less than the pre-determined time difference, then the client node 102 may calculate the epoch identity value Epoch_ID based on real time, for example, a node real time. In one embodiment, the node real time used by the client node 102 to calculate Epoch_ID may be the group node's 104 real time Gnode_time 314. In another embodiment, the client node 102 may use its own real time Cnode_time to calculate Epoch_ID. The particular node real time used should be used by both the client node 102 and group node 104 so that both calculate the same Epoch_ID value. If the time difference is greater than the predetermined time difference, the group node 104 may be considered compromised and establishment of session keys may be terminated.

Once the client node 102 has calculated an epoch identity value Epoch_ID based on Gnode_time, the client node 102 may derive the restricted key $K_R$ using, for example, the formula:

$$K_R = \text{CMAC}(K_M, \text{Gnode\_ID} \| \text{Epoch\_ID})$$

where Gnode_ID is the group node's 104 identity, Epoch_ID is the established epoch value, $K_M$ is the shared secret key shared between the client node 102 and central node 106, and CMAC is a Cipher-based message authentication code (CMAC) algorithm 316. As discussed above, other inputs, arguments, and/or coding schemes may be used.

The group node 104 may determine on its own the epoch identity value Epoch_ID based on the same node real time used by the client node 102. For example, if the client node 102 used Gnode_time to calculate Epoch_ID, then the group node 102 will also use its real time Gnode_time 318. If the difference between Cnode_time and Gnode_time was less than the predetermined time window (step 312), then the Epoch_ID calculated by the group node 104 should be the same as the Epoch_ID calculated at client node 102 since both used the same node real time to calculate Epoch_ID. Next, the group node may obtain/retrieve the restricted key $K_R$ specifically associated with the epoch identity value Epoch_ID and the client identifier Cnode_ID 320. Thus, for an Epoch_ID value corresponding to Epoch A 301, the group node 104 may retrieve the restricted key $K_R$ associated with Cnode_ID and Epoch A 301.

Next, a two-round session key establishment protocol 322 may be used to generate the session keys by using the restricted key $K_R$ as a master key along with random values (for example nonces) provided by both the client node 102 and the group node 104. In other words, the restricted key $K_R$ is used to derive the session keys used for communications between the two nodes. Note that the key $K_R$ is not directly transmitted between the client node 102 and the group node 104, but because it is known to both nodes, $K_R$ can be used to establish a session key between the two nodes. In this manner, a session key may be established between the client node 102 and the group node 104 to conduct a secure communications session 324.

In one embodiment, a replacement set of proxy tokens associated with Epoch B 303 may be transmitted from the central node 106 to the group node 104 before the expiration of Epoch A 326a. The replacement set of proxy tokens will similarly contain tuples identifying restricted keys $K_R$ for a given client node for the given epoch (Epoch B). By transmitting the proxy tokens to the group nodes in the communication system before the start of Epoch B, there will be greater assurance that most if not all of the group nodes in the system will have stored the new set of proxy token by the start of Epoch B. Moreover, the group node 104 may has access to the new set of tokens in case communication with the central node 106 is lost during the time when the epochs transition.

For example, a communication outage may occur between the group node 104 and the central node 106 that commences just before the central node 106 is ordinarily scheduled to transmit proxy tokens for a new epoch. A communication outage between the group node and the central node could prevent the group node from getting new proxy tokens, and thus no client-to-group communication sessions could be established until the outage was over. To overcome this, the central node 106 may send the proxy tokens for the new epoch well in advance of the beginning of the new or anticipated epoch. For example, if epochs are an hour, and communication outages are expected to last not more than 5 minutes, the central node may send the proxy tokens fifteen (15) minutes in advance of each epoch transition. As a result, token delivery to the group node 104 may be better assured. In another embodiment, the replacement set of proxy tokens may be transmitted to the group node upon expiration of Epoch A 326b.

Establishing session keys between the group node 104 and the client node 102 may take place without requiring communications to take place between the group node 104 and the central node 106 during the current epoch once the group node 104 has received its proxy tokens for the current epoch. Thus, communications between the group node 104 and central node 106 may be intermittent and/or unavailable throughout the epoch once the group node 104 has acquired the proxy tokens.

If a group node is decommissioned, lost, stolen, becomes faulty, or is compromised, the central node 106 may remove it from its list of uncompromised group nodes, and after the current epoch expires, the affected group node will not have any valid proxy tokens, and thus cannot establish secure communication sessions with client nodes. Therefore a central node may revoke permission of a group node to establish communications with a client node 102 by terminating the sending of proxy tokens to the group node. The revocation becomes effective at the beginning of the next epoch.

The restricted key $K_R$ may be used many times during an epoch to generate various session keys between the group node 104 and client node 102. To avoid unnecessarily deriving the restricted key $K_R$ for each session with the group node 104 during the same epoch, the client node 102 may maintain a cache with tuples comprising, for example, the group node identity Gnode_ID, epoch identity value, and the associated restricted key. As a result, battery power in the client node 102 may be saved.

As only loose clock synchronization may be used, it may be possible that the group node 104 uses a restricted key $K_{R\_A}$ associated with an expiring epoch, Epoch A, and the client node 102 may already have access to a restricted key $K_{R\_B}$ for an upcoming epoch, Epoch B. However, as described above the client node 102 may use Gnode_time to calculate the epoch identity value, assuming the difference between Gnode_time and Cnode_time is less than a predetermined amount. This ensures that both calculate the same Epoch_ID value and associated restricted key even if the client node 102 has received notice of the epoch transition to Epoch B. For example, the client node 102 may receive and use a Gnode_time that translates to an Epoch_ID value of "8000." The client node may still calculate a restricted key $K_{R\_8000}$ associated with the epoch value "8000" even though its own real time clock would register an epoch value of "8001" due to loose clock synchronization.

As described above, the client node 102 may receive the group node's 104 real time Gnode_time included in a message 310, check to determine if the group node's real time is close to its real time Cnode_time 312, and if so, then compute the epoch identity value Epoch_ID from the group node's real time Gnode_time. If, for example, the group node 104 does not have the restricted key corresponding to Epoch_ID, the group node 104 (which may be compromised) may attempt to send an old one real time and use the corresponding old restricted key, or it may send its current epoch identity and try to guess the current restricted key $K_R$. If the group node 104 does send an old/outdated real time, the client node may discover that it is not close enough to its real time Cnode_time and reject the request of the group node 104 to establish a communication session. Moreover, the key validation step in the session key establishment protocol 324 may fail and the client node 102 may reject the request to establish the communication session.

Exemplary Communication System—Epoch Identity Derivable by Negotiation

Figure 4:
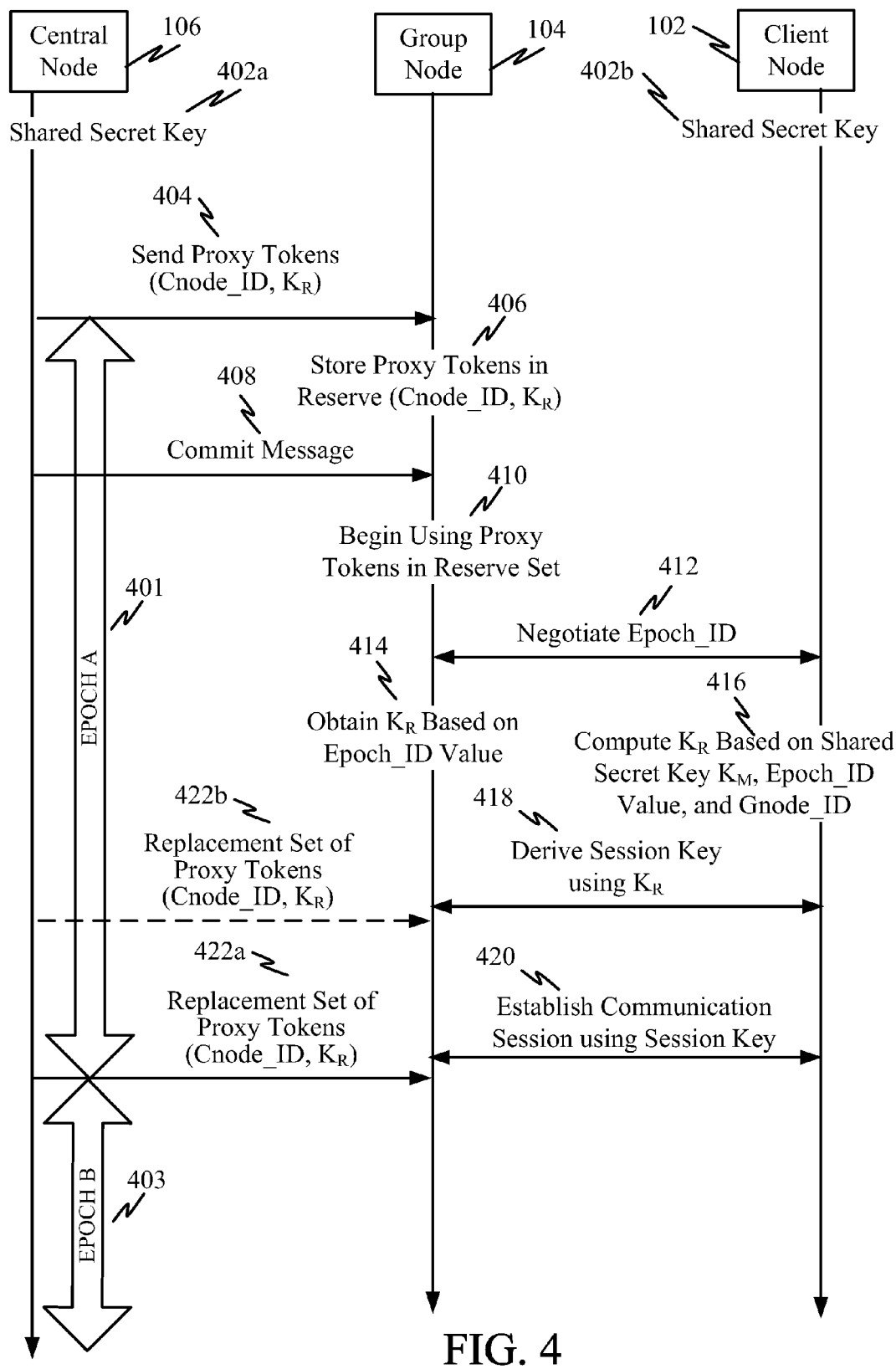
FIG. 4 is a flow diagram illustrating one example of the operation of the communication system in which a session key is established between a client node and a group node without requiring per-session communication between the group node and a central node.

FIG. 4 is a flow diagram illustrating one example of the operation of the communication system 100 in which a session key is established between a client node 102 and a group node 104 without requiring per-session communication between the group node 104 and a central node 106. The central node 106 and the client node 102 may each have access to a shared secret key $K_M$ 402a, 402b, which is not known to the group node 104. The shared secret key $K_M$ may be client node specific such that each client node in the communication system 100 shares a different secret key with the central node 106. The client node 102 may be associated with a client node identifier Cnode_ID.

Time within the communication system 100 may be divided into epochs, such as Epoch A 401 and Epoch B 403, where Epoch B 403 occurs after Epoch A 401 in time. However, in this example, the client node 102 may have no reliable time clock and epochs may not necessarily be of fixed duration, but rather occur whenever the central node 106 chooses to start a new epoch.

For each epoch, the group node 104 may communicate at least once with the central node 106. For example, at the start of Epoch A 401 (or in some embodiments prior to the start of Epoch A 401) the central node 106 may increment the epoch counter and transmit at least one proxy token 404 to the group node 104 for each client node 102. The central node 106 may continue to transmit proxy tokens to all the group nodes until either all the group nodes have been reached, or it has determined that some group nodes cannot be reached. The central node 106 may however try at least as long as the longest expected communication outage between the central node 106 and a group node.

The proxy token transmitted is associated with a particular epoch, for example, Epoch A 401. Thus, for each client node in the communication system, the central node 106 may send a proxy token associated with an epoch to the group node 104 where the proxy token comprises a client identifier Cnode_ID and a restricted key $K_R$. The group node 104 may then store the one or more proxy tokens received and associated with Epoch A in reserve as a reserve set of proxy tokens 406. The central node 106 may then transmit a commit message 408 to the group node 104. The commit message instructs the group node 104 that that the Epoch A has begun and that the group node 104 should use the new proxy tokens held in reserve 410. In one embodiment, the group node 104 may discard any old/outdated proxy tokens associated with a prior epoch once it switches to the proxy tokens held in the reserve set. In other embodiments, the old/outdated proxy tokens may be kept in case another client node seeking to establish communications has not received notice of the epoch transition and therefore uses an older restricted key.

The client node 102 and group node 104 may then negotiate a common epoch identity value Epoch_ID that identifies the current epoch by one or both nodes exchanging epoch identity value information 412. The epoch identity value Epoch_ID should be negotiated to be equal to the greater value of the maximum (i.e., most recent) epoch identity value Epoch_ID$_{GN}$ known to the group node 104 and the maximum epoch identity value Epoch_ID$_{CN}$ known to the client node 102. The value of Epoch_ID$_{CN}$ may be based on all prior successful session key establishment operations with all group nodes.

In one example, negotiation of an Epoch_ID value may begin by the group node 104 transmitting a message to the client node 102 that includes the group node epoch value Epoch_ID$_{GN}$ and the group node identifier Gnode_ID. The client node 102 may then compare the Epoch_ID$_{GN}$ value received to its own client node epoch value Epoch_ID$_{CN}$, and select the greater of the two as being Epoch_ID. The client node 102 then transmits Epoch_ID to the group node 104. In some embodiments, once the session key has been established between client node 102 and the group node 104, the client node 102 may flush its cache and replace the cache values with a tuple consisting of the epoch identity value Epoch_ID, group node identifier Gnode_ID, and the restricted key KR, if Epoch_ID is greater than Epoch_ID$_{CN}$.

In another example, the client node 102 may first transmit Epoch_ID$_{CN}$ to the group node 104. The group node 104 may then compare Epoch_ID$_{CN}$ to its own epoch value Epoch_ID$_{GN}$, and select the greater of the two. The epoch value selected by the group node 104 having a value Epoch_ID$_{GN}$_Select may then be transmitted back to the client node 102. The client node 102 may then determine whether Epoch_ID$_{GN}$_Select is greater than or equal to the epoch value Epoch_ID$_{CN}$ it previously sent to the group node 104. If Epoch_ID$_{GN}$_Select is greater than or equal to Epoch_ID$_{CN}$ then the client node 102 will set Epoch_ID equal to Epoch_ID$_{GN}$_Select. Otherwise, if Epoch_ID$_{GN}$_Select is less than Epoch_ID$_{GN}$_Select then the client node 102 may determine that the group node 104 is compromised and abort session key establishment. In some embodiments, once the session key has been established between client node 102 and the group node 104, the client node 102 may flush its cache and replace the cache values with a tuple consisting of the epoch identity value Epoch_ID, group node identifier Gnode_ID, and the restricted key KR, if Epoch_ID is greater than Epoch_ID$_{CN}$.

Notwithstanding how Epoch_ID is negotiated, the goal is to establish the same epoch identity value Epoch_ID at the client node 102 and the group node 104. Once the client node 102 and the group node 104 have established Epoch_ID, the group node 104 may obtain/retrieve the restricted key $K_R$ specifically associated with the Epoch_ID and the client identifier Cnode_ID that it has stored 414. The group node 104 may retrieve the restricted key $K_R$ from either the reserve set of proxy tokens it previously stored 406 or an active set of proxy tokens it already had stored, depending on which set includes the Epoch_ID value. The client node 102 may derive the restricted key $K_R$ using, for example, the formula: $K_R$=CMAC (Gnode_ID∥Epoch_ID, $K_M$) 416 as described above.

Next, a two-round session key establishment protocol may be used to generate the session keys 418 by using the restricted key $K_R$ as a master key along with random values (for example nonces) exchanged between the client node 102 and the group node 104. In other words, the restricted key $K_R$ is used to derive the session keys used for communications between the two nodes. Note that the key $K_R$ is not directly transmitted between the client node 102 and the group node 104, but because it is known to both nodes, $K_R$ can be used to establish a session key between the two nodes. In this manner, a session key may be established between the client node 102 and the group node 104 to conduct a secure communications session 420.

Epoch B 403 may commence when the central node decides to end Epoch A 401. In one embodiment, another set of replacement proxy tokens is transmitted to the group node 104 at the start of Epoch B 422*a*. In another embodiment, the replacement proxy tokens may be transmitted prior to the end of Epoch A 422*a*.

Establishing session keys between the group node 104 and the client node 102 may take place without requiring communications between the group node 104 and the central node 106 during the current epoch since the group node 104 has all ready received the proxy tokens associated with that epoch. Thus, communications between the group node 104 and central node 106 may be intermittent and/or unavailable throughout the epoch once the group node 104 has received the proxy tokens for that epoch.

If a group node is decommissioned, lost, stolen, becomes faulty, or is compromised, the central node 106 may remove it from its list of uncompromised group nodes, and after the current epoch expires, the affected group node will not have any valid proxy tokens, and thus cannot establish secure communication sessions with client nodes. Therefore a central node 106 may revoke permission of a group node to establish communications with a client node 102 by terminating the sending of proxy tokens to the group node. The revocation becomes effective at the beginning of the next epoch.

In the embodiments where the Epoch_ID is established via negotiation 412, epoch identity values may be directly transmitted between the client node 102 and the group node 104. This may differ from other embodiments herein where real time values are exchanged, such as Gnode_time being transmitted from the group node 104 to the client node 102 in step 310 of FIG. 3. Moreover, compromised group nodes that have been determined to be compromised by the central node may be rejected by the client node after the client node learns of a greater (more recent in time) epoch identity value. The client node may acquire the greater epoch value from communications with another uncompromised group node where the communications take place after commencement of an epoch in which the central node did not send proxy tokens to the compromised group node.

Moreover, in some embodiments the client node 102 and group node 104 may perform select transmissions of steps 412 and 418 at the substantially the same time. For example, the epoch identity values Epoch_ID$_{CN}$, Epoch_ID$_{GN}$, and/or Epoch_ID$_{GN}$_Select may be piggybacked onto one or more messages of the session key establishment protocol 418.

In some embodiments, if group node 104 determines that the epoch identity value Epoch_ID negotiated 412 corresponds to the proxy token being held in reserve, the group node 104 may retrieve the restricted key K$_R$ from the proxy token held in reserve even if the group node 104 has not received a commit message 408 from the central node 106. This can only occur if at least some uncompromised group nodes have received commit messages, which implies that the central node 106 has begun the commit phase, but the group node 104 at issue has not yet received the commit message 408. This action prevents the asynchronous nature of the epoch transition notifications sent by the central node 106 to group nodes 104a-104c in the system 100 from causing session key establishment failures.

Exemplary Client Node

Figure 5:
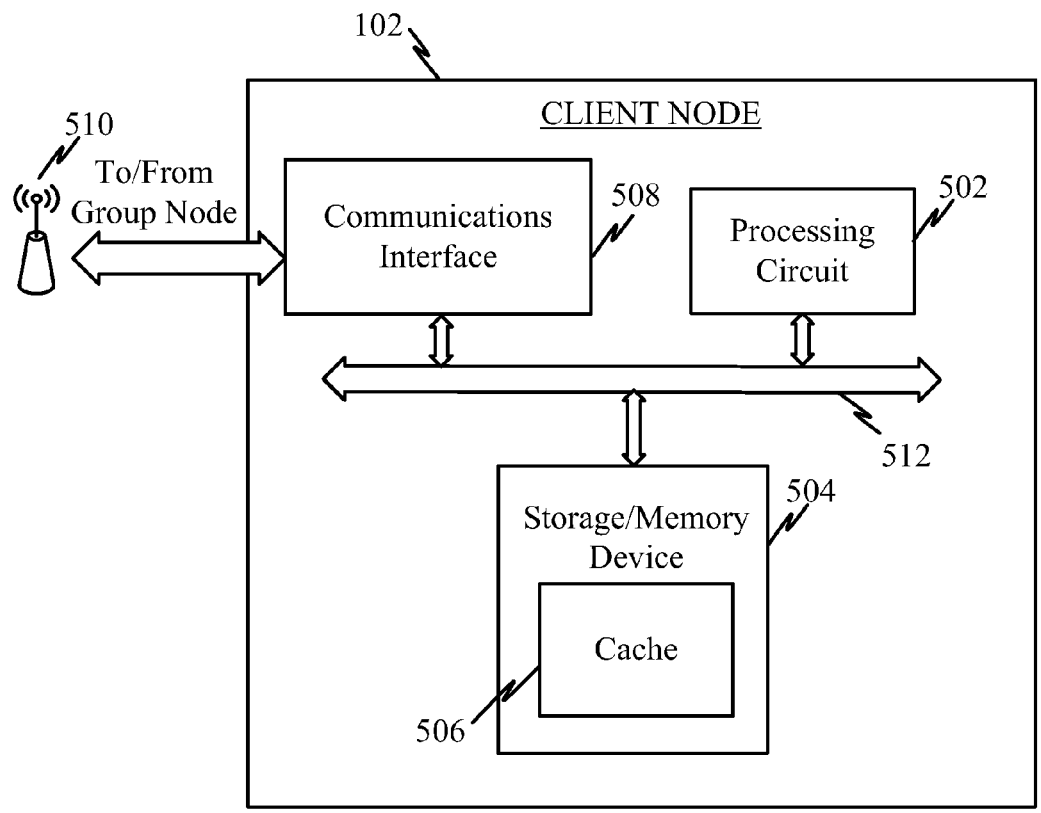
FIG. 5 illustrates a functional block diagram of the client node according to one example.

FIG. 5 illustrates a functional block diagram of the client node 102 according to one example. The client node 102 may comprise a processing circuit (e.g., processor, processing module, application specific integrated circuit (ASIC), etc.) 502, a memory circuit (e.g., memory, memory device, memory module, etc.) 504, a cache 506, and/or a communications interface 508 that may all be communicatively coupled to one another, for example, via a communications bus 512.

The processing circuit 502 may perform data processing including execution of processor readable process steps, such as any of the steps operational at the client node described herein and illustrated in the figures. For example, the processing circuit 502 may be a specialized processor (e.g., ASIC) that is adapted to perform at least steps 602, 604, and 606 shown in FIG. 6. The memory circuit 504 may include the cache 506 that may store tuples containing the identities of group nodes Gnode_ID, restricted keys K$_R$, and associated epoch identity information, such as, Epoch_ID. The cache 506 may be a virtual cache or a logical cache that allows data to be retrieved quickly. The communications interface 508 may utilize any low power communications protocols, such as but not limited to, Bluetooth®, Bluetooth® Low Energy, Wifi, and/or Zigbee® protocols, for communicatively coupling the client node 102 to one or more group nodes in the communication system 100 (e.g., via a wireless connection 510).

Exemplary Operation of a Client Node Establishing Session Key

Figure 6:
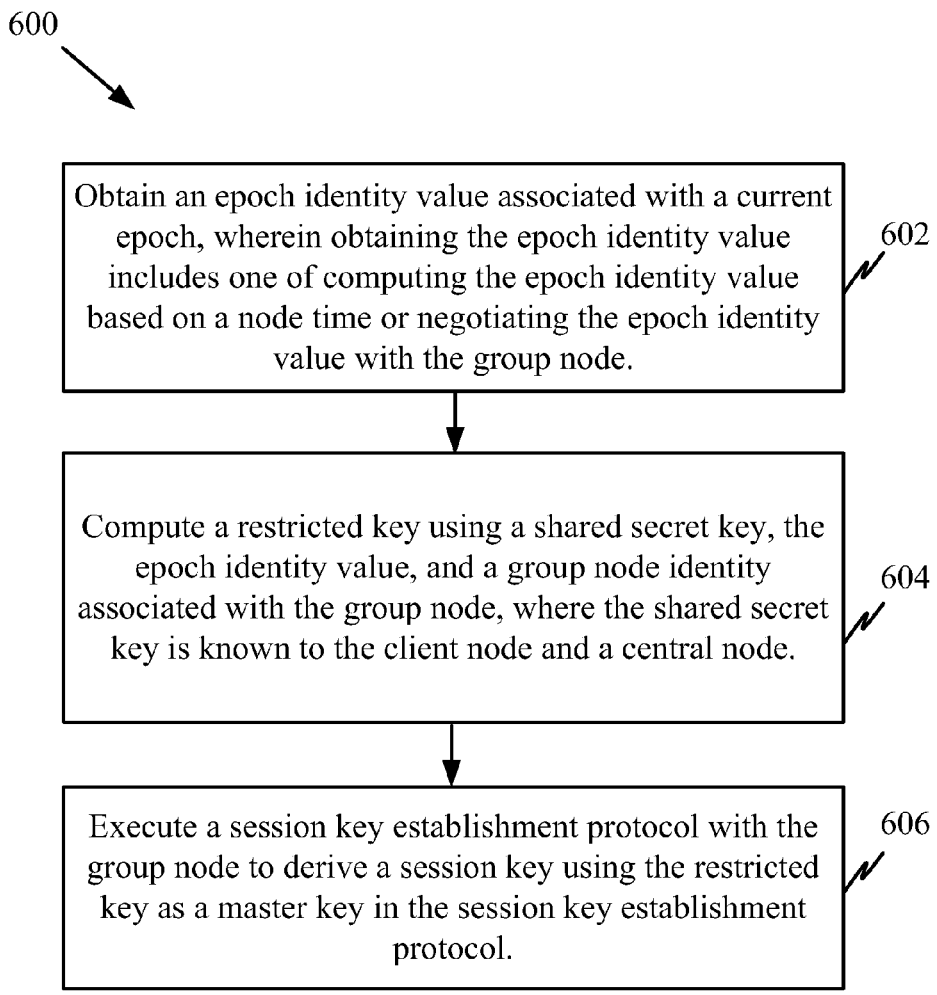
FIG. 6 illustrates a flowchart demonstrating an exemplary method operational at a client node for establishing a session key between the client node and a group node.

FIG. 6 illustrates a flowchart 600 demonstrating an exemplary method operational at a client node for establishing a session key between the client node and a group node. First, the client node obtains an epoch identity value associated with a current epoch, wherein obtaining the epoch identity value includes one of computing the epoch identity value based on a node real time or negotiating the epoch identity value with the group node 602. Next, the client node computes a restricted key using a shared secret key, the epoch identity value, and a group node identity associated with the group node, where the shared secret key is known to the client node and a central node 604. Then, the client node executes a session key establishment protocol with the group node to derive a session key using the restricted key as a master key in the session key establishment protocol 606. A key verification process may also be used by the client node 102 and the group node 104 to verify the session key.

In one embodiment, time may be loosely synchronized between the client node, the group node, and the central node. Moreover, obtaining the epoch identity value associated with the current epoch may include: receiving a group node real time and the group node identity from the group node; comparing the group node real time with a client node real time; determining that the group node real time is within a maximum time threshold difference of the client node real time; and computing the epoch identity value from the node real time.

In another embodiment, obtaining the epoch identity value associated with the current epoch may include: receiving a group node epoch value and the group node identity from the group node; comparing the group node epoch value to a client node epoch value, the client node epoch value equal to a last known epoch identity value used in a last successfully established session with any group node; computing the epoch identity value as the larger of the group node epoch value and the client node epoch value; and transmitting the computed epoch identity value to the group node.

In yet another embodiment, obtaining the epoch identity value associated with the current epoch may include: transmitting a client node epoch value to the group node, the client node epoch value equal to a last known epoch identity value used in a last successfully established session with any group node; receiving the epoch identity value and the group node identity from the group node; and verifying that the received epoch identity value is equal to or greater than the client node epoch value transmitted.

Exemplary Operation of a Client Node Using Real Time to Define Epochs

Figure 7A:
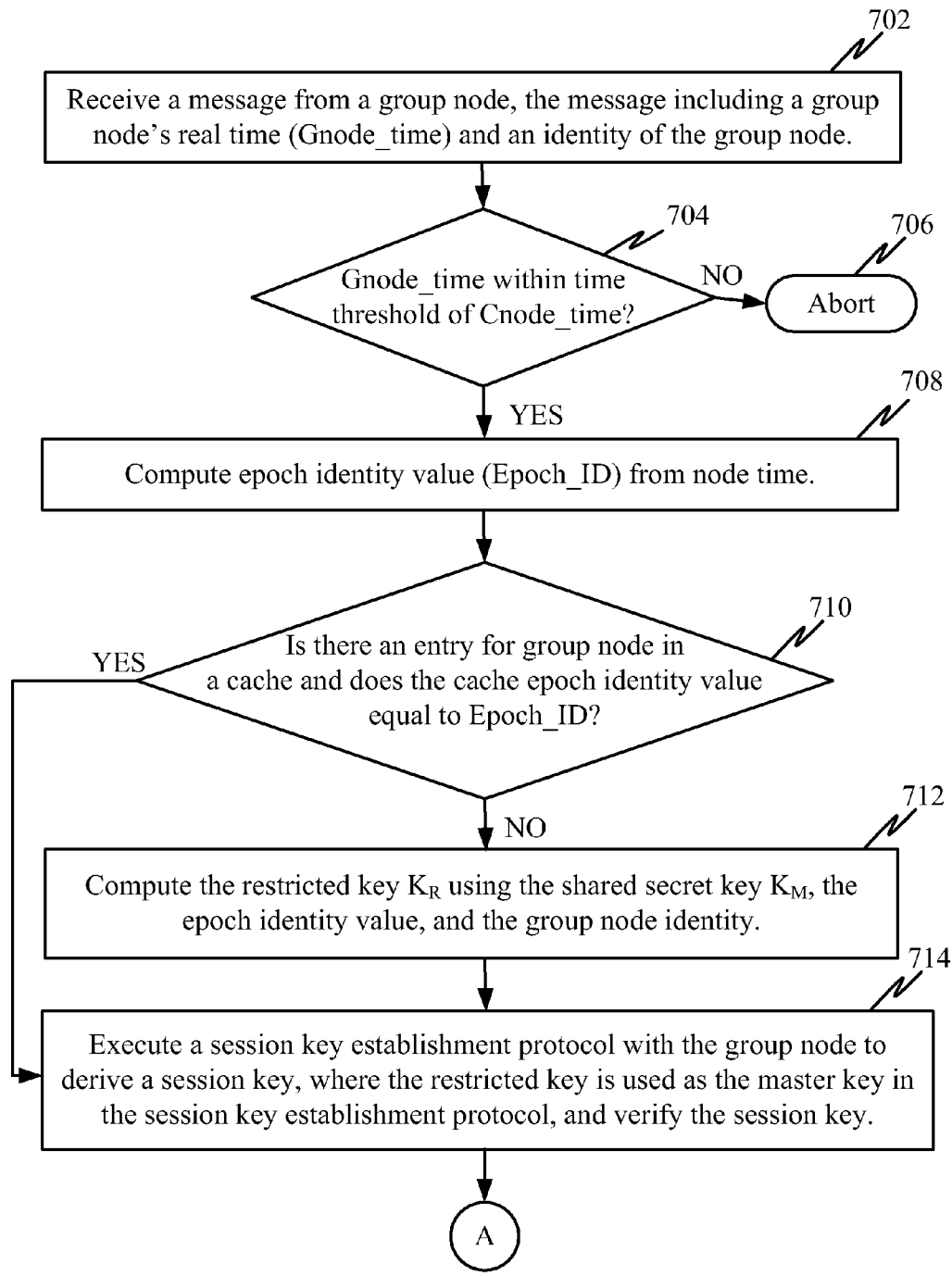
FIG. 7 (comprising FIGS. 7A and 7B) illustrates one example of the operation of the client node for establishing a session key between the client node and a group node using real time to define epochs.
Figure 7B:
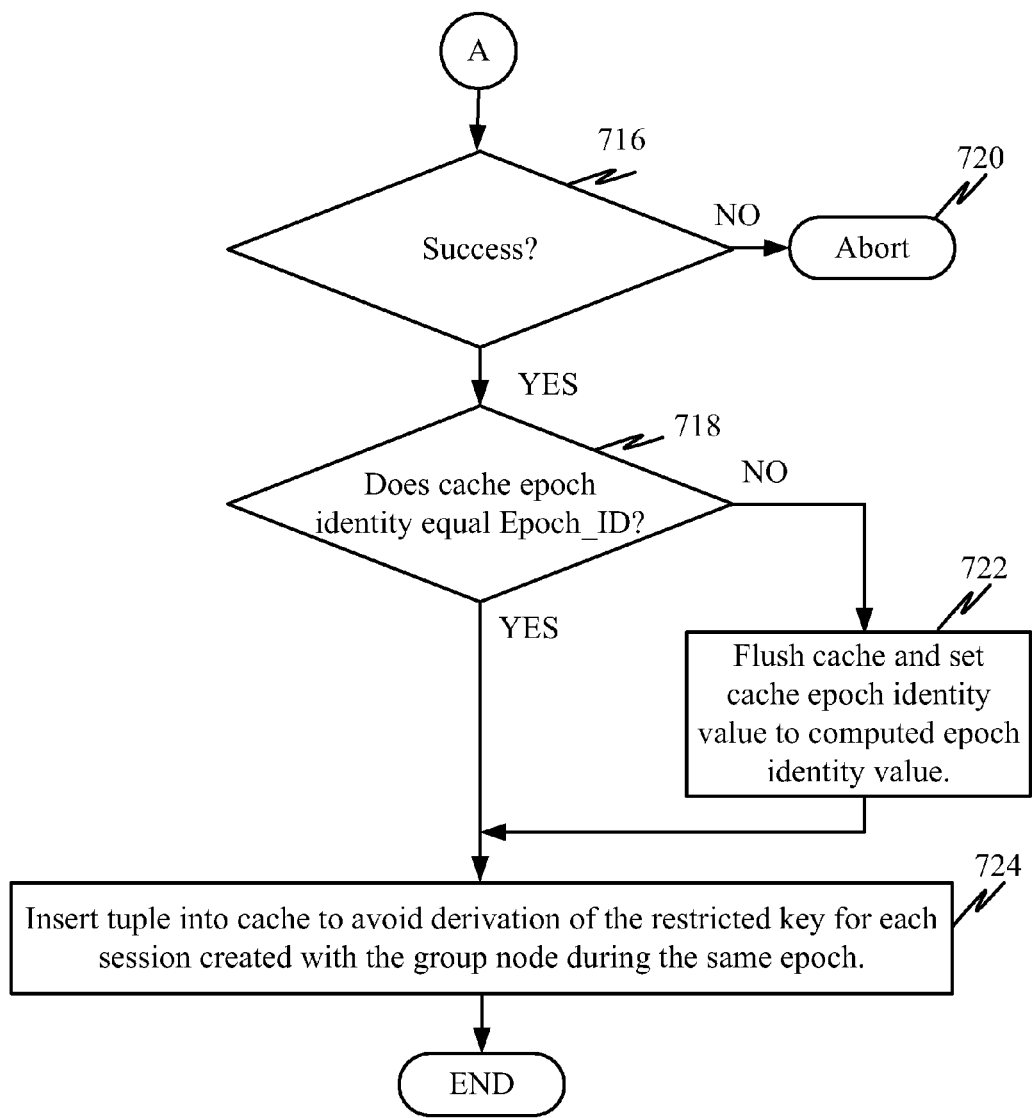

FIG. 7 (comprising FIGS. 7A and 7B) illustrates one example of the operation of the client node for establishing a session key between the client node and a group node using real time to define epochs. First, the client node may receive a message from a group node, the message including the group node's real time Gnode_time and a group node identity Gnode_ID 702. Next, the client node may determine if the group node's real time is close to the client node's real time Cnode_time 704. This may be determined by comparing the group node's real time with a client node's real time, wherein a restricted key K$_R$ is established if the group node's real time is within a predetermined time threshold of the client node's real time. If the group node's real time is not within the threshold, the session may be aborted 706.

If the group node's real time is within a window of predetermined width (i.e., within a predetermined time threshold), the client node may compute the epoch identity value Epoch_ID from a node real time, for example, the group node's real time Gnode_time 708. Next, it may be determined if there is an entry for the group node in a cache and if the cache epoch identity value equals the computed epoch identity value Epoch_ID 710. If there is no entry for the group node in the cache or the cache epoch identity value does not equal the computed epoch identity value Epoch_ID, the client node may then compute the restricted key K$_R$ using the shared secret K$_M$, the epoch identity value Epoch_ID, and the group node identity Gnode_ID 712. The shared secret key may have been established by a virtual pairing protocol when the client node first joined the system.

Next, the client node may execute a session key establishment protocol with the group node to derive a session key, where the restricted key K$_R$ is used as the master key in the session establishment protocol 714. A key verification protocol may also be implemented to verify the session key. Alternatively, if there is an entry for the group node in the cache and the cache epoch identity value equals the computed epoch identity value Epoch_ID 710, the client node does not compute the restricted key and immediately may execute a session key establishment protocol with the group node to derive a session key, where the restricted key is used as the master key in the session establishment protocol 714. Next, if the session key is successfully derived 716, it may be determined whether the cache epoch identity value equals the computed epoch identity value Epoch_ID 718. If the session key is not successfully derived or verified then the session may be aborted 720.

If the cache epoch identity value does not equal the computed epoch identity value Epoch_ID, the cache may be flushed and the cache epoch identity may be set to the computed epoch identity value Epoch_ID 722. The client node then inserts a tuple into a cache to avoid derivation of the restricted key for each session created with the group node during the same and/or current epoch 724.

Otherwise, if the cache epoch identity value equals the computed epoch identity value, the cache is not flushed and the client node then inserts a tuple into a cache to avoid derivation of the restricted key for each session created with the group node during the same and/or current epoch 724.

Figure 8A:
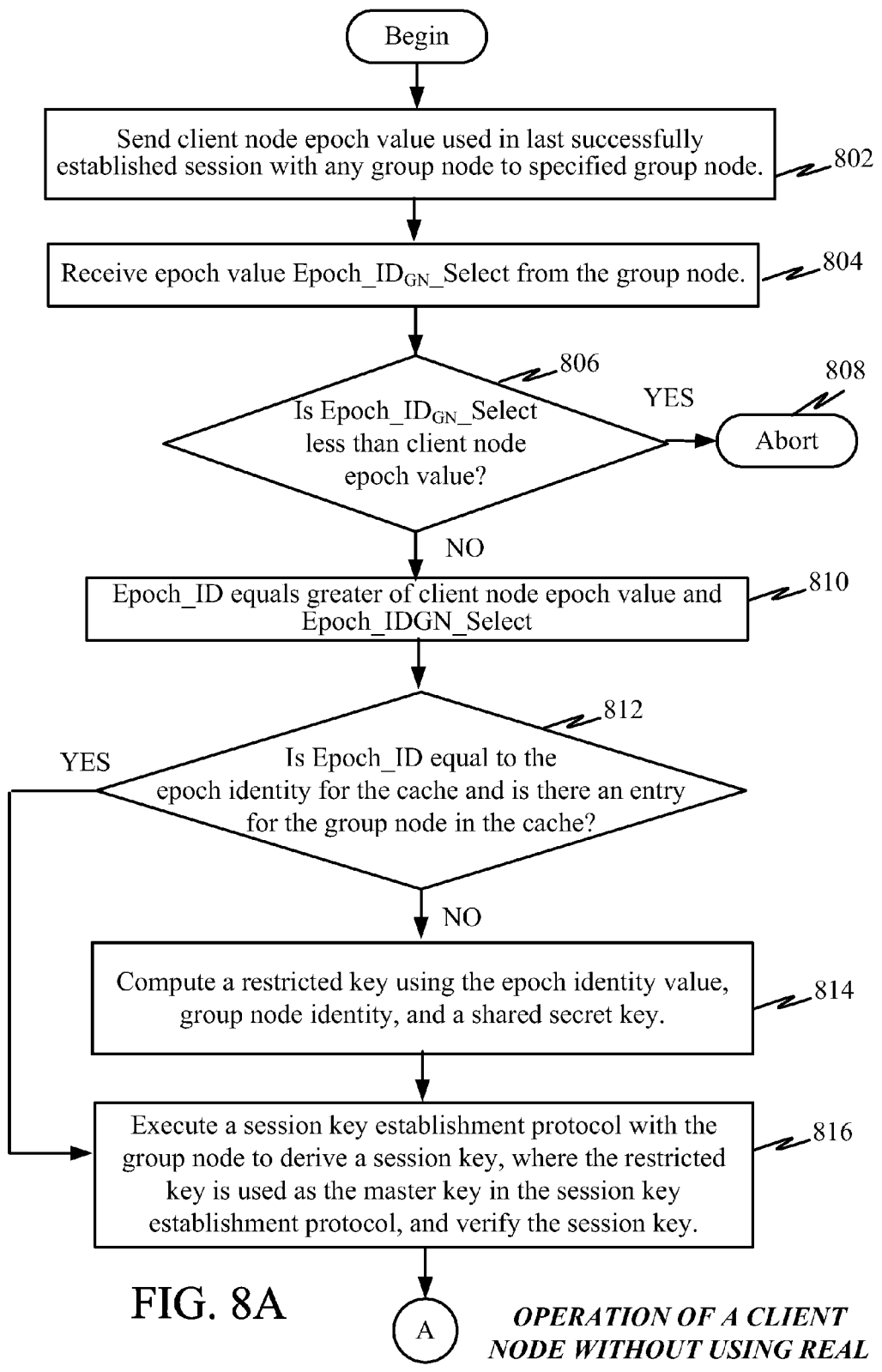
FIG. 8 (comprising FIGS. 8A and 8B) illustrates an example of the operation of the client node for establishing a session key between the client node and a group node without using real time to define epochs, and where the client node initiates the session.
Figure 8B:
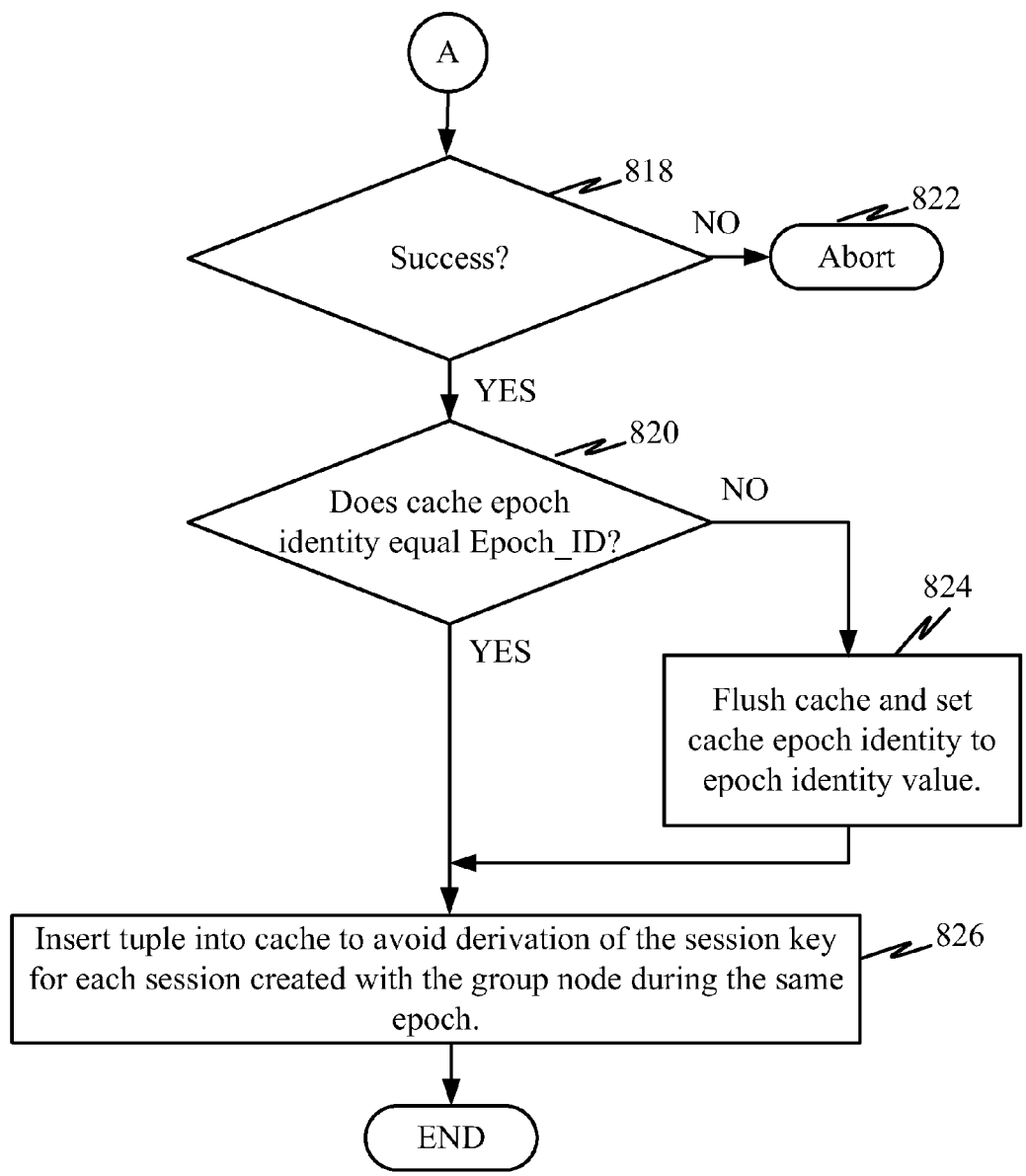

Exemplary Operation of a Client Node without Using Real Time to Define Epochs, Client Node Initiated FIG. 8 (comprising FIGS. 8A and 8B) illustrates an example of the operation of the client node for establishing a session key between the client node and a group node without using real time to define epochs, and where the client node initiates the session. First the client node may send/transmit a client node epoch value Epoch_ID$_{CN}$ that is equal to a last known epoch identity value used in a last successfully established session with any group node to a specified group node with which it will communicate 802. It may then receive an epoch value Epoch_ID$_{GN\_}$Select from the group node 804. The received epoch value Epoch_ID$_{GN\_}$Select should be the greater of (most recent in epoch time) the client node epoch value transmitted to the group node and a maximum epoch value Epoch_ID$_{GN}$ at the group node. If the received epoch identity Epoch_ID$_{GN\_}$Select is less than the client node epoch identity transmitted to the group node 806, the client node may abort the session establishment 808. Otherwise, the epoch identity value Epoch_ID (herein also referred to as the "effective epoch identity") equals the greater of the client node epoch value transmitted and the epoch identity Epoch_ID$_{GN\_}$Select received 810.

Next, it may be determined if the epoch identity value Epoch_ID is equal to the epoch identity for the cache and if there is an entry for the group node in the cache 812. If the epoch identity value Epoch_ID equals the epoch identity for the cache or there is an entry for the group node in the cache, the client node may execute a session key establishment protocol with the group node to derive a session key wherein the client node uses the restricted key K$_R$ as the master key 816. Alternatively, if the epoch identity value Epoch_ID does not equal the epoch identity for the cache and there is no entry for the group node in the cache, the client node first computes a restricted key K$_R$ using the epoch identity value Epoch_ID, the group node identity Gnode_ID, and a shared secret key K$_M$ 814. The shared secret key may have been established via a previous communication between the client node and a central node. Next, the client node executes the session key establishment protocol with the group node to derive a session key where the client node uses the restricted key K$_R$ as the master key and the session key is verified using a key verification protocol 816. If the session key establishment protocol is not successful, then the session may be aborted 822. If the restricted key is successfully derived 818, it may then be determined if the cache epoch identity equals the epoch identity value Epoch_ID 820.

If the cache epoch identity does not equal the epoch identity value Epoch_ID, the cache may be flushed and the cache epoch identity may be set to the epoch identity value Epoch_ID 824. The client node may then insert a tuple into a cache to avoid derivation of the restricted key for each session created with the group node during the same epoch 826.

Alternatively, if the cache epoch identity equals the epoch identity value Epoch_ID, the cache is not flushed and the client node may then inserts a tuple into a cache to avoid derivation of the restricted key for each session created with the group node during the same epoch 826.

Figure 9A:
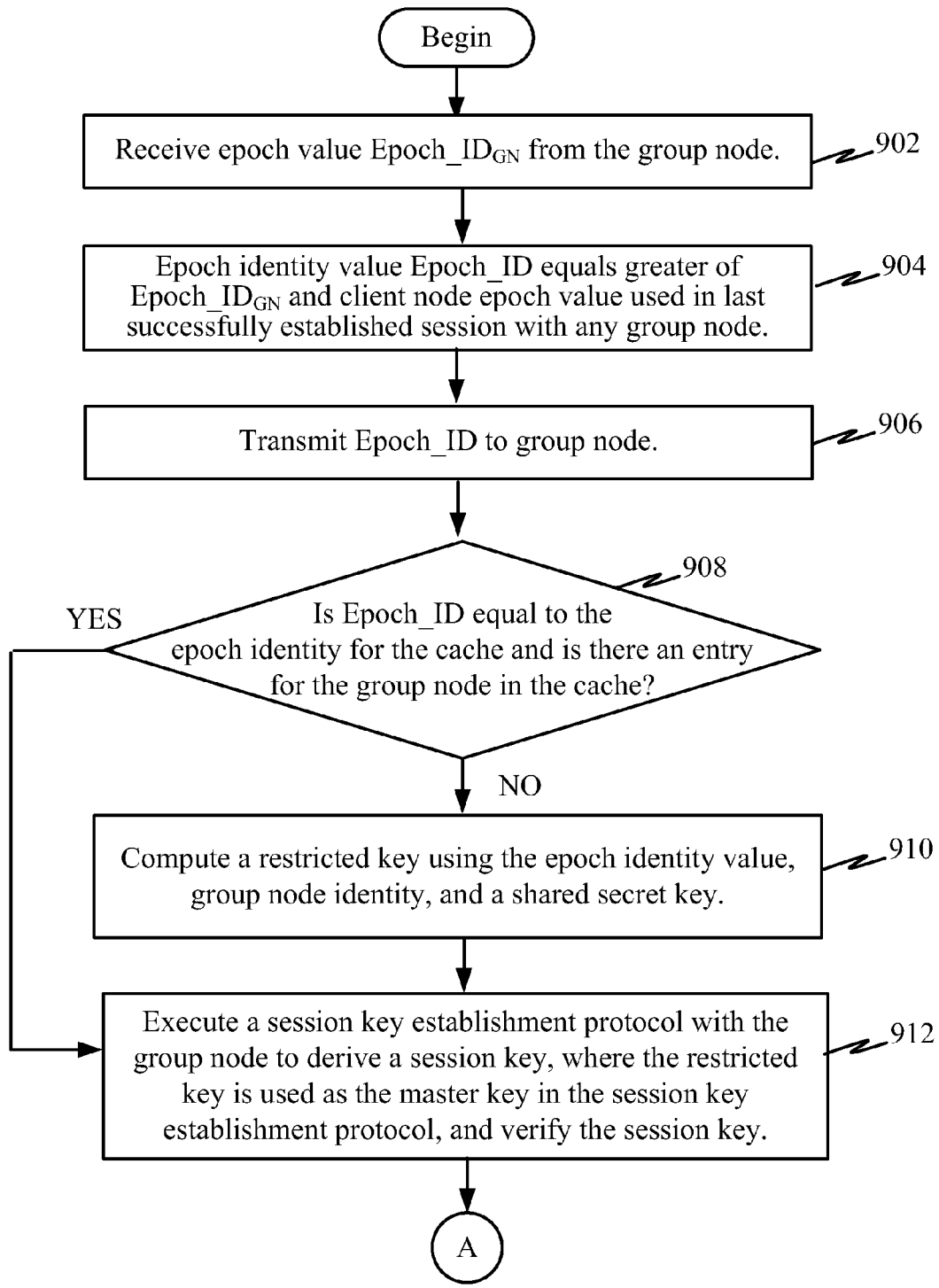
FIG. 9 (comprising FIGS. 9A and 9B) illustrates an example of the operation of the client node for establishing a session key between the client node and a group node wherein real time is not used to define epochs, and where the group node initiates the session.
Figure 9B:
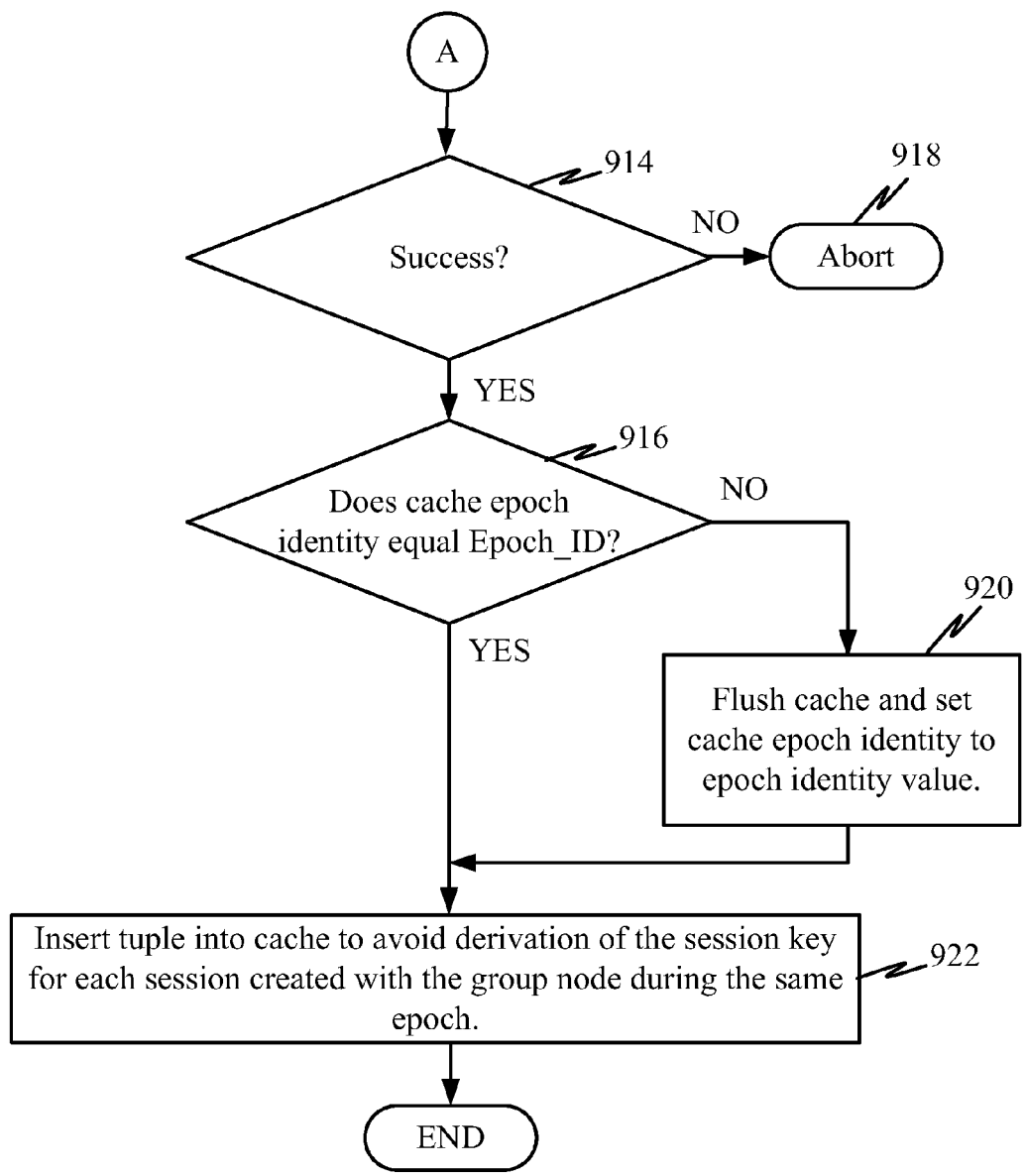

Exemplary Operation of a Client Node without Using Real Time to Define Epochs, Group Node Initiated FIG. 9 (comprising FIGS. 9A and 9B) illustrates an example of the operation of the client node for establishing a session key between the client node and a group node wherein real time is not used to define epochs, and where the group node initiates the session. First, the client node may receive a group node epoch value Epoch_ID$_{GN}$ from the group node where Epoch_ID$_{GN}$ is associated with a maximum epoch value at the group node 902. The epoch identity value Epoch_ID may then be computed. The epoch identity value Epoch_ID may equal to the greater value (most recent in epoch time) of the received group node epoch value and the client node epoch value Epoch_ID$_{CN}$ 904. The client node epoch value may be equal to a last known epoch identity value used in a last successfully established session with any group node.

The epoch identity value Epoch_ID may then be transmitted to the group node 906. Next, it may be determined if there is an entry for the group node in the cache and if the epoch identity value Epoch_ID is equal to the epoch identity for the cache 908. If there is an entry for the group node in the cache and the epoch identity value Epoch_ID equals the epoch identity for the cache, the client node may execute a session key establishment protocol with the group node to establish a session key, where the client node uses the restricted key K$_R$ as the master key 912. Alternatively, if the epoch identity value Epoch_ID does not equal the epoch identity for the cache or there is no entry for the group node in the cache, the client node first computes a restricted key K$_R$ using the epoch identity value Epoch_ID, the group node identity Gnode_ID, and a shared secret key K$_M$ 910. The shared secret key may have been established via a previous communication between the client node and a central node. Next, the client node executes the session key establishment protocol with the group node to generate a session key where the client node uses the restricted key K$_R$ as the master key 912.

If the session key is successfully derived 914, it may then be determined if the cache epoch identity equals the epoch identity value Epoch_ID 916. If the session key establishment protocol fails and/or the session key is not verified, the session may be aborted 918.

If the cache epoch identity does not equal the epoch identity value Epoch_ID, the cache may be flushed and the cache epoch identity may be set to the epoch identity value Epoch_ID 920. The client node may then insert a tuple into a cache to avoid derivation of the restricted key for each session created with the group node during the same epoch 922.

Alternatively, if the cache epoch identity equals the epoch identity value Epoch_ID, the cache is not flushed and the client node may then inserts a tuple into a cache to avoid derivation of the restricted key for each session created with the group node during the same epoch 922.

Exemplary Group Node

Figure 10:
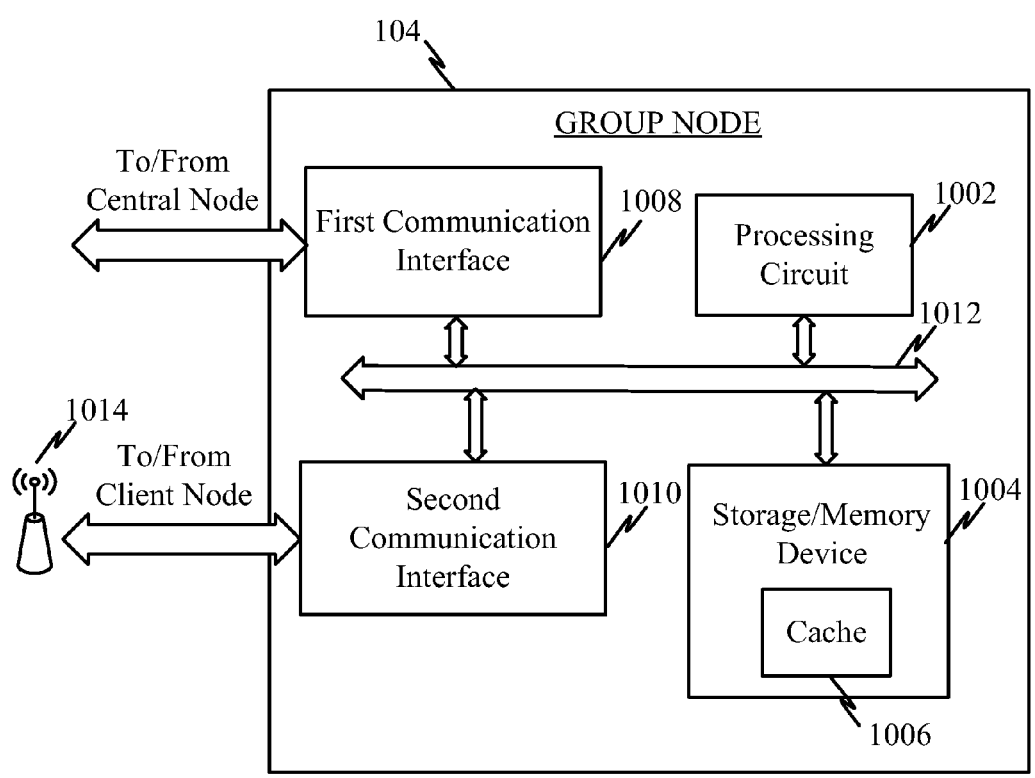
FIG. 10 illustrates a functional block diagram of the group node according to one example.

FIG. 10 illustrates a functional block diagram of the group node 104 according to one example. The group node 104 may provide for indirect communication between the client node 102 and the central node 106. The group node 104 may include a processing circuit (e.g., processor, processing module, ASIC, etc.) 1002, a memory circuit (e.g., memory, memory device, memory module, etc.) 1004, a cache 1006, a first communications interface 1008, and/or a second communications interface 1010 that may all be communicatively coupled to one another, for example, via a communications bus 1012.

The processing circuit 1002 may perform data processing including execution of processor readable process steps, such as any of the steps operational at the group node described herein and/or illustrated in the figures. For example, the processing circuit 1002 may be a specialized processor (e.g., ASIC) that is adapted to perform at least steps 1102-1108 shown in FIG. 11. The memory circuit 1004 may include the cache 1006 that may store proxy tokens (active or reserve sets), session keys, client node identifiers, restricted keys $K_R$ and associated epoch identity information, such as, Epoch_ID, and other data. The first communications interface 1008 is adapted to communicatively couple the group node 104 to the central node 106. The first communications interface may be either wireless or a wireline connection. The second communications interface 1010 may utilize any low power communications protocols, such as but not limited to, Bluetooth®, Bluetooth® Low Energy, Wifi, and/or Zigbee® protocols, for communicatively coupling the group node 104 to a client node 102 in the communication system 100 (e.g., via a wireless connection 1014).

Exemplary Operation of a Group Node Establishing Session Key

Figure 11:
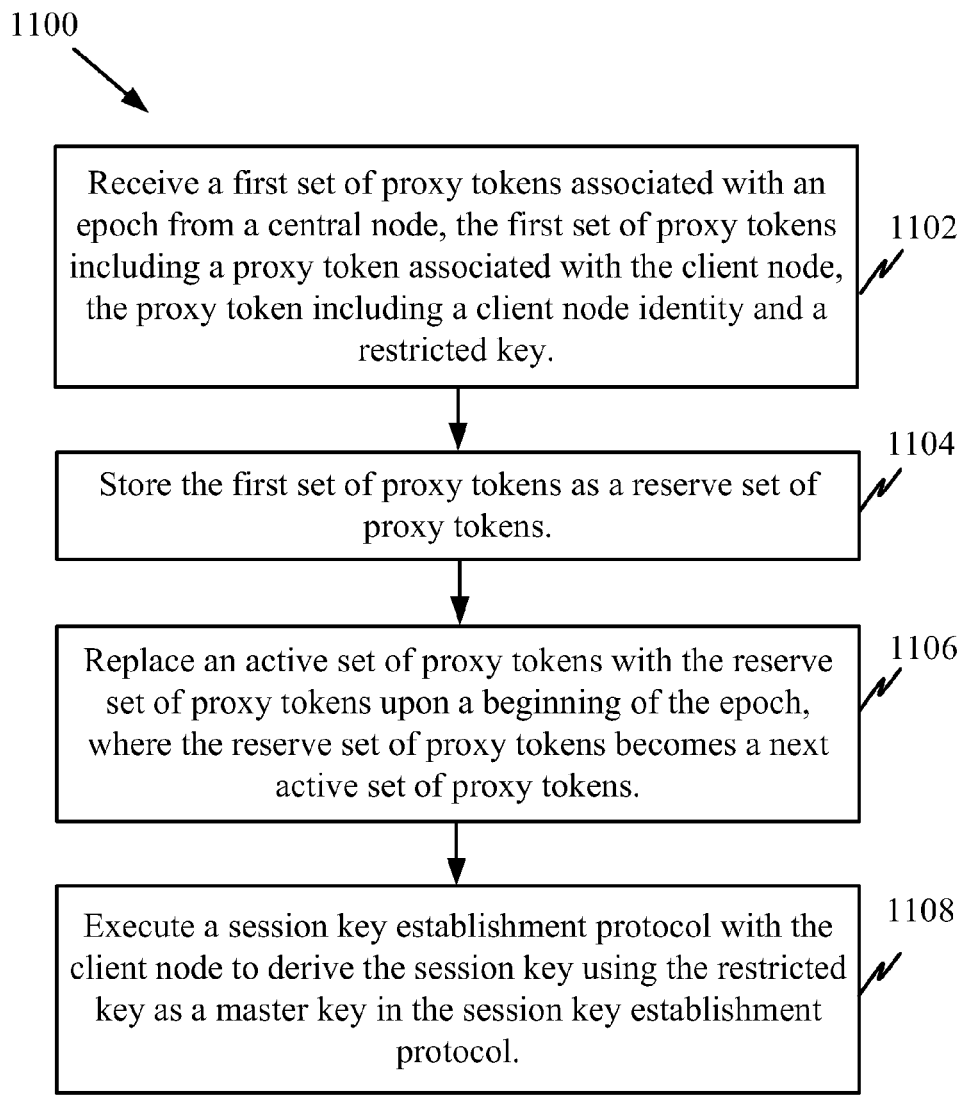
FIG. 11 illustrates a flowchart demonstrating an exemplary method operational at a group node for establishing a session key between the group node and a client node.

FIG. 11 illustrates a flowchart 1100 demonstrating an exemplary method operational at a group node for establishing a session key between the group node and a client node. First, the group node receives a first set of proxy tokens associated with an epoch from a central node, where the first set of proxy tokens includes a proxy token associated with the client node, and the proxy token includes a client node identity and a restricted key 1102. Next, the group node stores the first set of proxy tokens as a reserve set of proxy tokens 1104. Then, the group node replaces an active set of proxy tokens with the reserve set of proxy tokens upon a beginning of the epoch, where the reserve set of proxy tokens becomes a next active set of proxy tokens 1106. Next, the group node executes a session key establishment protocol with the client node to derive the session key using the restricted key as a master key in the session key establishment protocol 1108.

In one embodiment, the group node may also obtain an epoch identity value associated with the epoch, and retrieve the restricted key based on the epoch identity value. In one example, obtaining the epoch identity value associated with the epoch may include: receiving a client node real time; comparing the client node real time to a group node real time; determining that the group node real time is within a maximum time threshold difference of the client node real time; and computing the epoch identity value based on a node real time.

In one example, retrieving the restricted key based on the epoch identity value may further include: determining whether the reserve set of proxy tokens or the active set of proxy tokens corresponds to the epoch identity value; obtaining the restricted key from the reserve set of proxy tokens if the reserve set of proxy tokens are associated with the epoch identity value; and obtaining the restricted key from the set of proxy tokens if the reserve set of proxy tokens are associated with the epoch identity value.

Exemplary Operation of Group Node Using Real Time to Define Epochs

Figure 12:
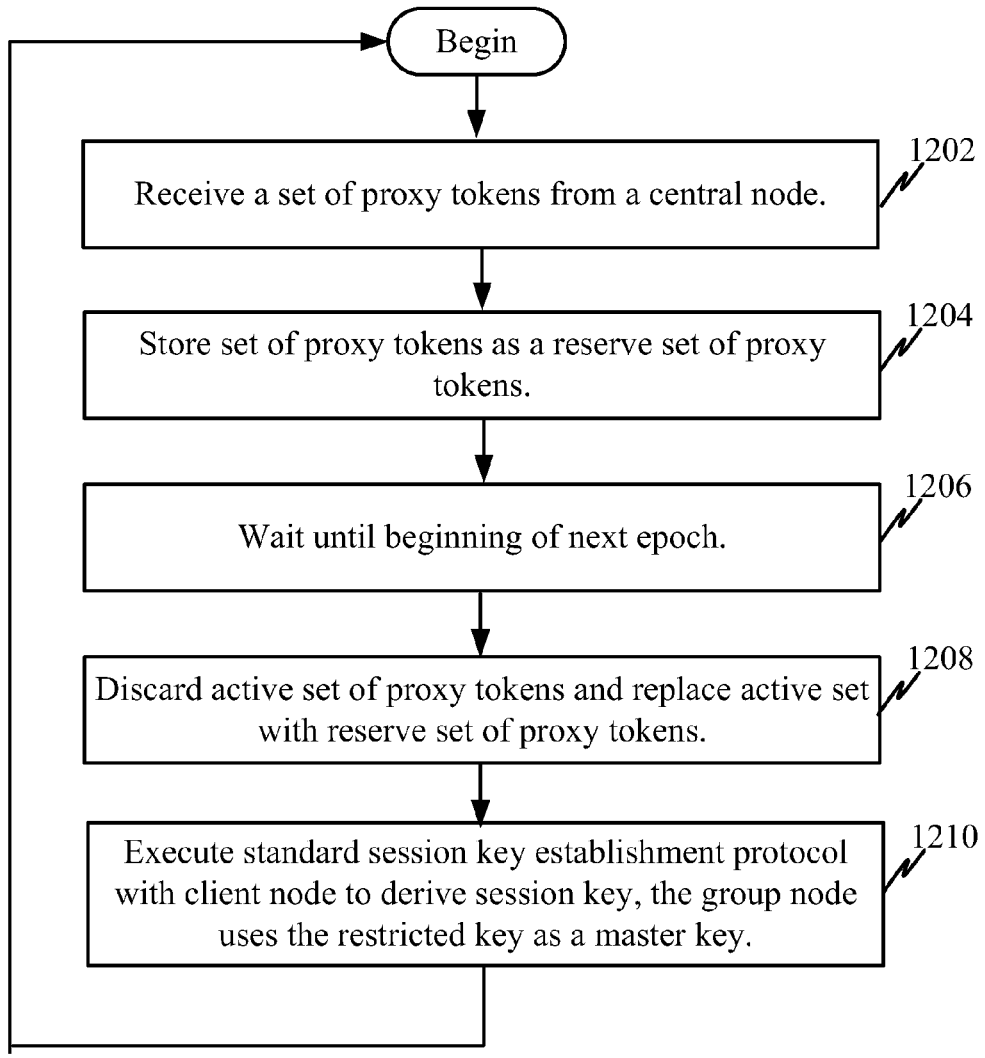
FIG. 12 illustrates an example of the operation of the group node relative to central node using real time to define epochs.

FIG. 12 illustrates an example of the operation of the group node relative to central node using real time to define epochs. The group node may receive a set of proxy tokens from a central node (i.e. a proxy token from a central node for each client node in a communication system) where each proxy token in the set has a client node identity and a restricted key 1202. The group node may then store the set of proxy tokens as a reserve set of proxy tokens 1204. It may then wait until the beginning of the next epoch 1206. Next, the group node may discard the active set of proxy tokens and replace them with the reserve set of proxy tokens, the reserve set of proxy tokens becoming next active set of proxy tokens 1208. A standard session key establishment protocol may then be executed with the client node to derive the session key where the group node uses the restricted key as a master key 1210.

Figure 13A:
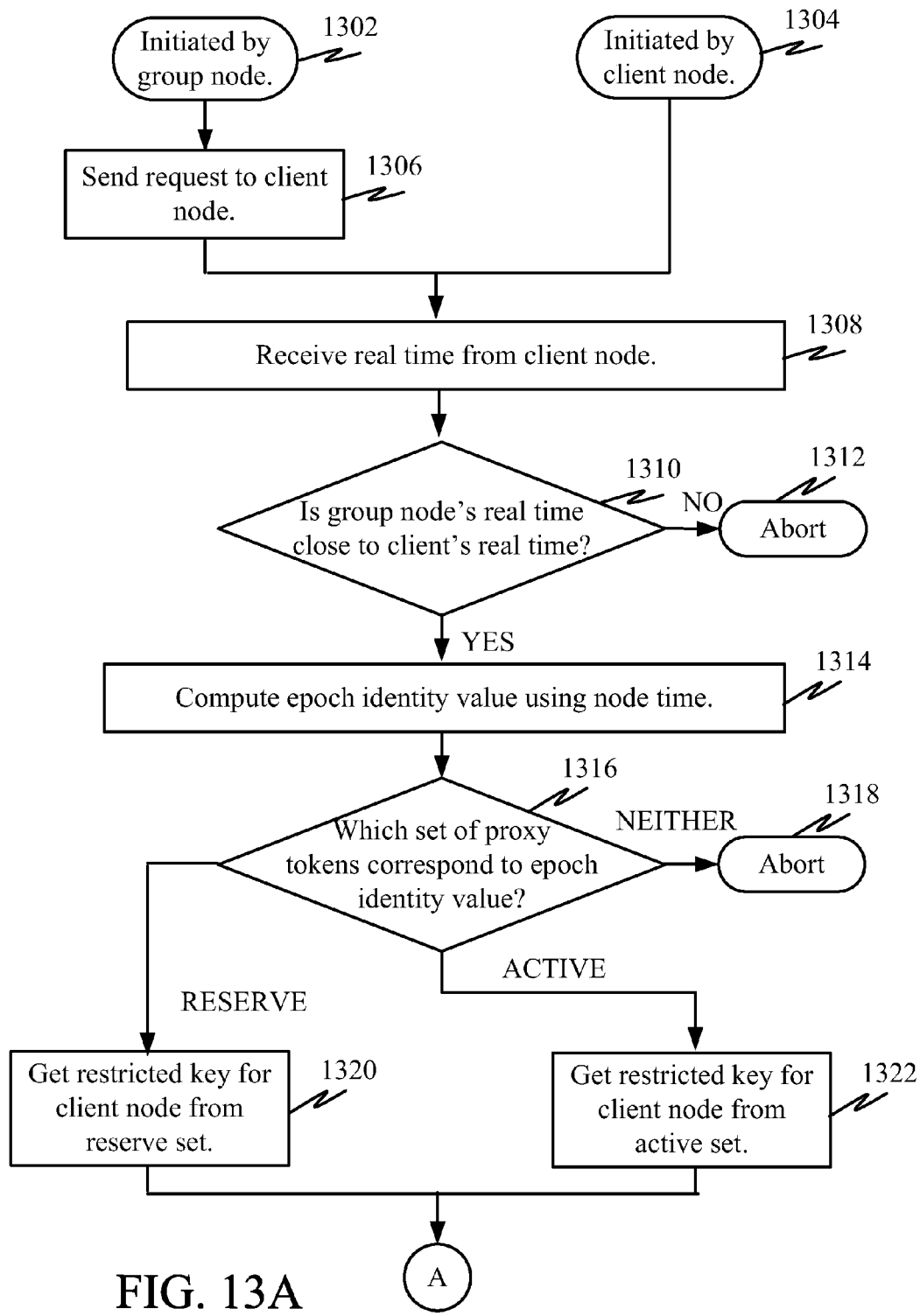
FIG. 13 (comprising FIGS. 13A and 13B) illustrates an example of the operation of the group node for establishing a communication session between the group node and a client node using real time to define epochs.
Figure 13B:
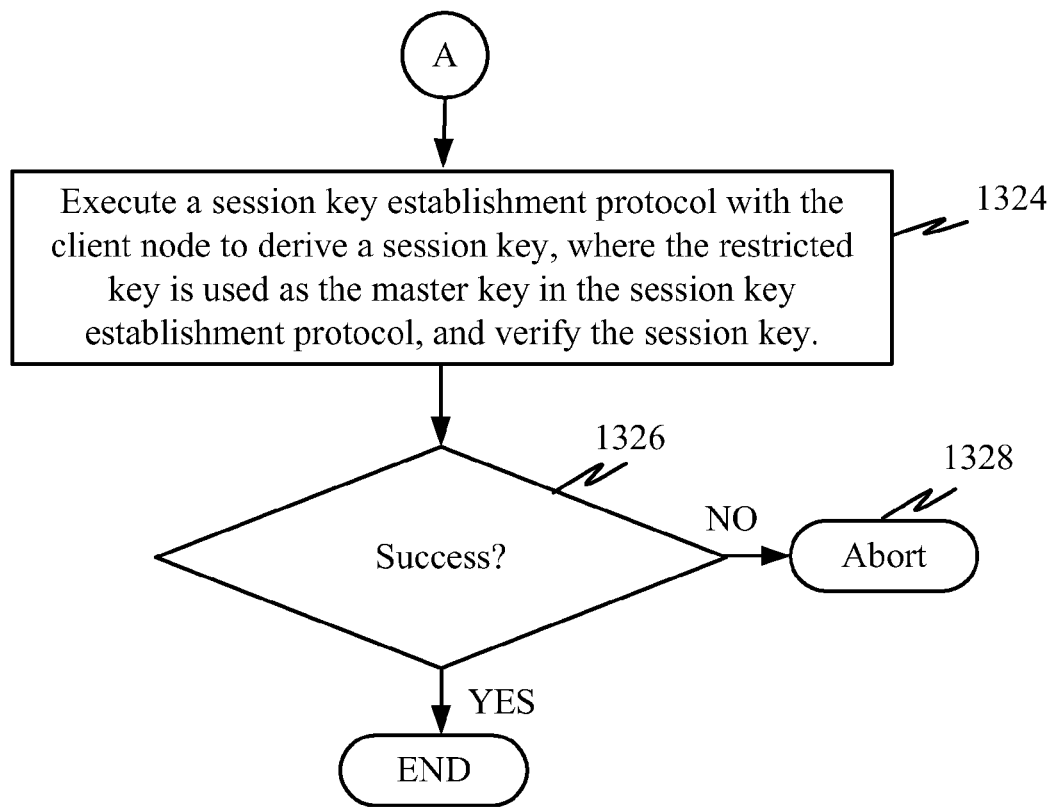

FIG. 13 (comprising FIGS. 13A and 13B) illustrates an example of the operation of the group node for establishing a communication session between the group node and a client node using real time to define epochs. The session may be initiated by the group node 1302 or the client node 1304. Once initiated, the group node may receive the client node's real time from the client node 1308. If the group node initiated the session, the group node may first send a request to the client node 1306.

Next, the group node may determine if the group node's real time is close to the client node's real time 1310. This may be determined by comparing the group node's real time with a client node's real time, wherein a restricted key is established if the group node's real time is within a predetermined maximum time threshold of the client node's real time. If the group node's real time is not within the threshold value the session may be aborted 1312. If the group node's real time is within the predetermined maximum time threshold, the group node may compute the epoch identity value from a node real time, for example, either the group node's real time or the client node's real time Cnode_time 1314. Whichever node real time the group node uses the client node must use the same node real time in order to calculate the same Epoch_ID.

Next, it may be determined which set of proxy tokens correspond to the computed epoch identity value 1316. If neither the reserve nor active set of tokens correspond to the computed epoch, the session may be aborted 1318. If the reserve set of tokens correspond to the computed epoch identity value, the restricted key for the client node is obtained from the reserve set 1320. If the active set of tokens corresponds to the computed epoch identity value, the restricted key for the client node is obtained from the active set 1322.

After the restricted key $K_R$ has been obtained, the group node may execute a session key establishment protocol with the client node to derive a session key, where the restricted key is used as the master key in the session key establishment protocol 1324. A key verification protocol may also be executed to verify the session key. Next a determination may be made as to whether the session key was successfully established 1326. If the session key was not successfully established and/or verified the session may be aborted 1328.

In another example of the operation of the group node for establishing a session key between a group node and a client node, the group node may obtain an epoch identity value associated with the epoch. Next, the group node may retrieve a restricted key based on the epoch identity value. In one embodiment, obtaining the epoch identity value associated with the epoch includes: receiving a client node real time; comparing the client node real time to a group node real time; determining that the group node real time is within a maximum time threshold of the client node real time; and computing the epoch identity value based on the group node real time. In another embodiment, retrieving the restricted key based on the epoch identity value further includes: determining whether the reserve set of proxy tokens or the active set of proxy tokens corresponds to the epoch identity value; obtaining the restricted key from the reserve set of proxy tokens if the reserve set of proxy tokens are associated with the epoch identity value; and obtaining the restricted key from the set of proxy tokens if the reserve set of proxy tokens are associated with the epoch identity value.

Exemplary Operation of Group Node without Using Real Time to Define Epochs

Figure 14:
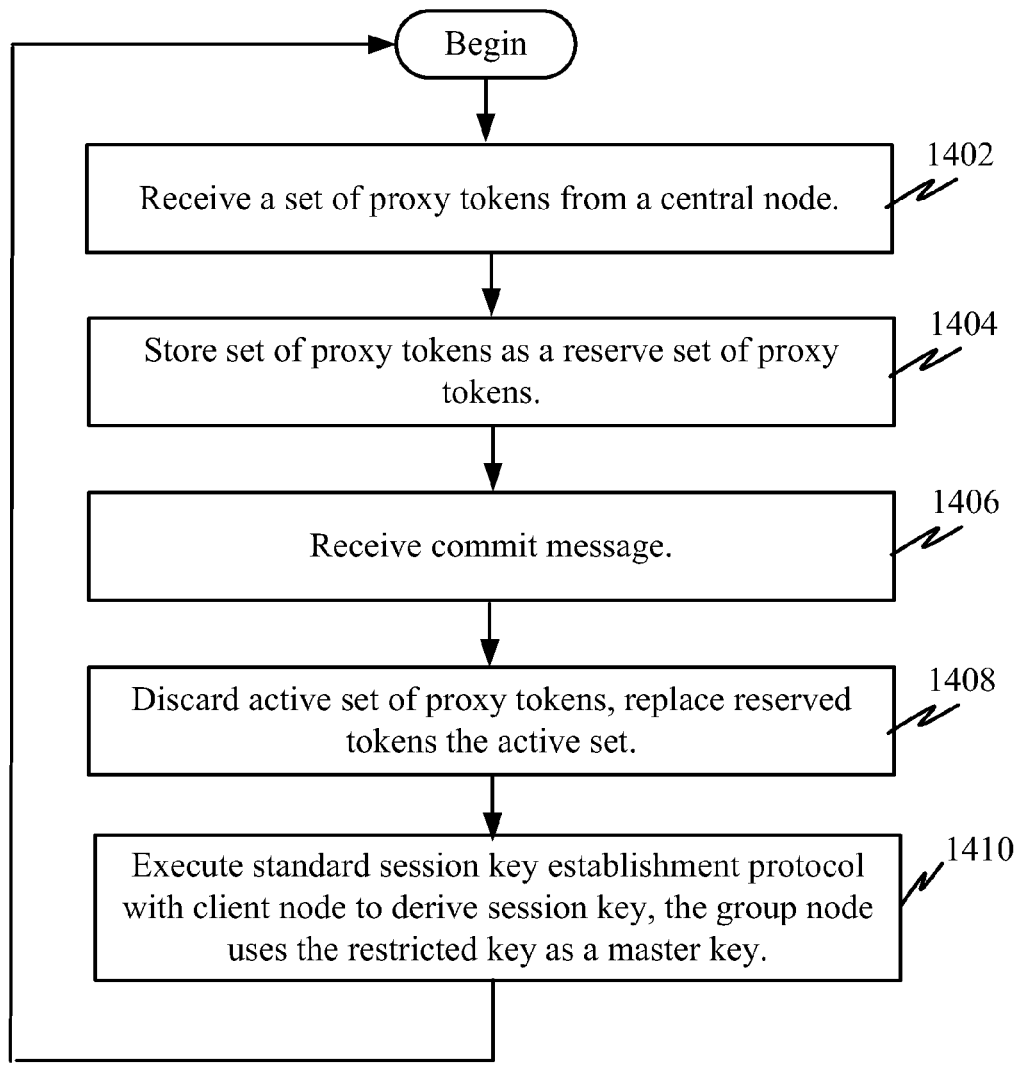
FIG. 14 illustrates an example of the operation of the group node relative to central node without using real time to define epochs.

FIG. 14 illustrates an example of the operation of the group node relative to central node without using real time to define epochs. The group node may receive a set of proxy tokens from a central node (i.e. a proxy token from a central node for each client node in a communication system) where each proxy token has a client node identity and a restricted key 1402. The group node may then store the set of proxy tokens as a reserve set of proxy tokens 1404. Upon receiving a commit message 1406, the group node may discard the active set of proxy tokens and replace with the reserve set of proxy tokens, the reserve set of proxy tokens becoming the next active set of proxy tokens 1408. A standard session key establishment protocol may then be executed with the client node to derive the session key where the group node uses the restricted key as a master key 1410.

Figure 15A:
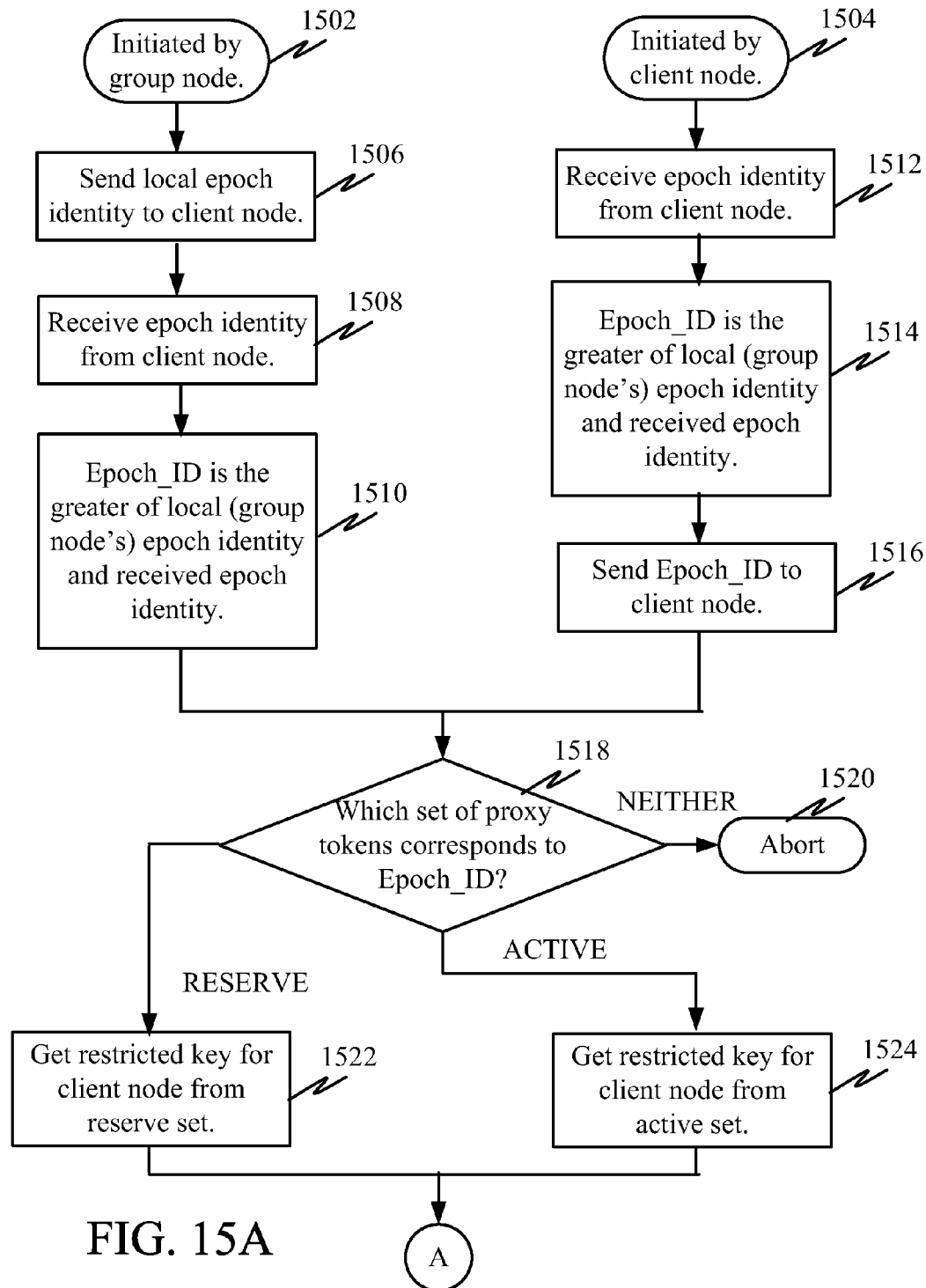
FIG. 15 (comprising FIGS. 15A and 15B) illustrates an example of the operation of the group node for establishing a communication session between the group node and a client node without using real time to define epochs.
Figure 15B:
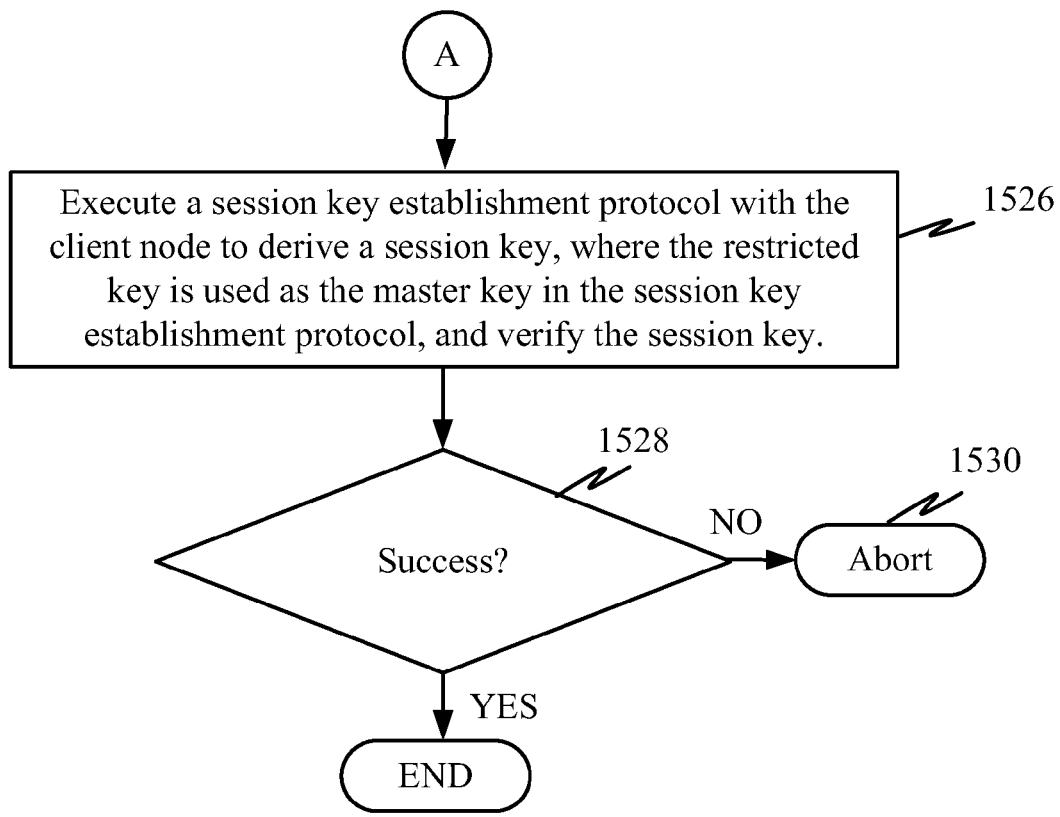

FIG. 15 (comprising FIGS. 15A and 15B) illustrates an example of the operation of the group node for establishing a communication session between the group node and a client node without using real time to define epochs. The session may be initiated by the group node 1502 or the client node 1504. If the session is initiated by the group node 1502, the group node may send a local epoch identity (e.g., Epoch_ID$_{GN}$) to the client node 1506 and receive an epoch identity from the client node (e.g., Epoch_ID$_{CN}$) 1508. The epoch identity value Epoch_ID is computed as the greater of the local (i.e. group node's) epoch identity and received epoch identity 1510.

If the session is initiated by the client node 1504, the group node may receive an epoch identity from the client node (e.g., Epoch_ID$_{CN}$) 1512. The epoch identity value Epoch_ID is computed as the greater of the local (i.e. group node's) epoch identity and received epoch identity 1510. The epoch identity value Epoch_ID may then be sent to the client node 1516.

Next, it may be determined which set of proxy tokens correspond to the computed epoch identity value Epoch_ID 1518. If neither the reserve nor active set of tokens correspond to the computed epoch identity value Epoch_ID, the session may be aborted 1520. If the reserve set of tokens correspond to the computed epoch identity value Epoch_ID, the restricted key for the client node is obtained from the reserve set 1522. If the active set of tokens corresponds to the computed epoch identity value Epoch_ID, the restricted key for the client node is obtained from the active set 1524.

After the restricted key $K_R$ has been obtained, the group node may execute a session key establishment protocol with the client node to derive a session key, where the restricted key is used as the master key in the session key establishment protocol 1526. A key verification protocol may also be executed to verify the session key. Next a determination may be made as to whether the session key was successfully established 1528. If the session key was not successfully established and/or verified the session may be aborted 1530.

A standard key establishment protocol with the client node may then be executed, wherein the restricted key is used as the master key in the key establishment protocol. Session key-verification may be provided and the communication session with the client node may be established.

In one embodiment, if the client node initiates the session establishment, the group node may receive an epoch identity value from the client node. Next, the client node may be sent a last committed epoch identity if the received epoch identity is less than or equal to the last committed epoch identity or the client node may be sent an uncommitted epoch identity if the received epoch identity is equal to the uncommitted epoch identity, the uncommitted epoch identity identifying an uncommitted epoch. Next, it may be determined if the received epoch identity is greater than the last committed epoch identity and the received epoch identity is unequal to the uncommitted epoch identity. If the received epoch identity is greater than the last committed epoch identity and the received epoch identity is unequal to the uncommitted epoch identity, the session establishment may be aborted.

However, if the received epoch identity is not greater than the last committed epoch identity and the received epoch identity is equal to the uncommitted epoch identity, a standard key establishment protocol with the client node may be executed. In one embodiment, the key-establishment protocol contains a key-verification step. The group node may then proceed with a communication session with the client node.

Exemplary Central Node

Figure 16:
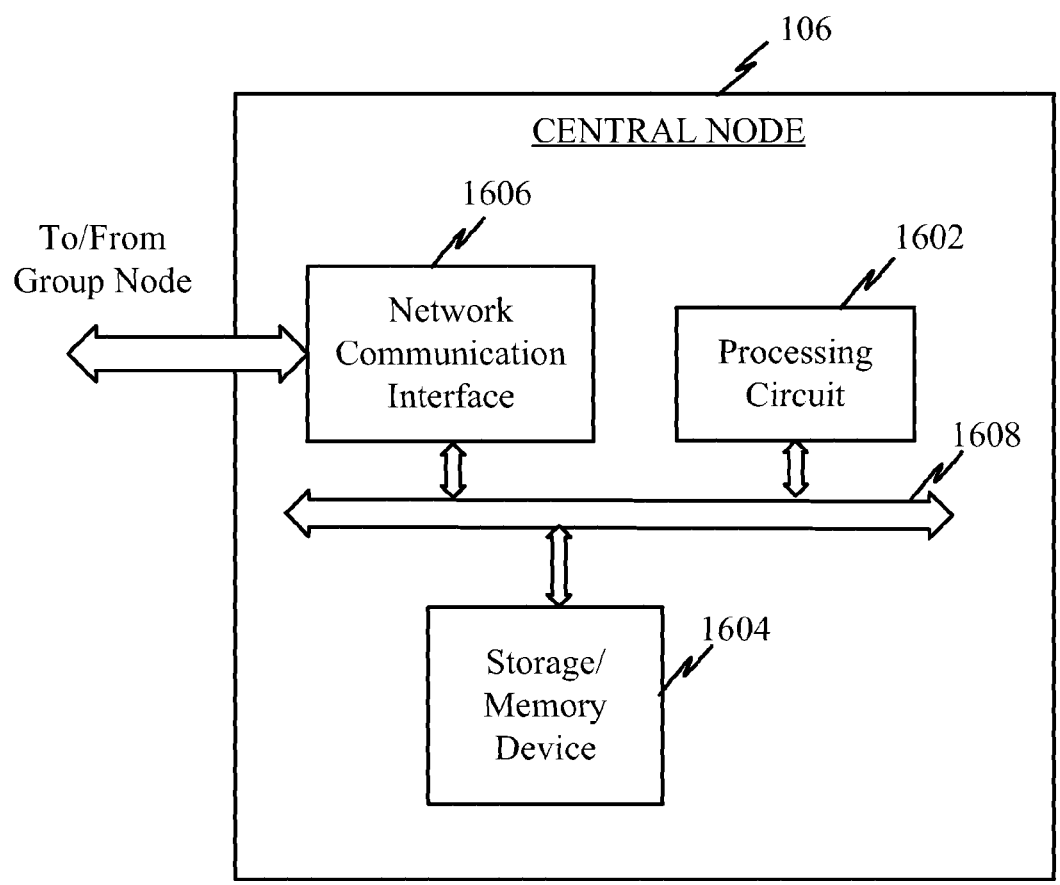
FIG. 16 illustrates a functional block diagram of a central node according to one example.

FIG. 16 illustrates a functional block diagram of a central node 106 according to one example. The central node 106 may communicate indirectly with a client node 102 via a group node 104a-10c. The central node 106 may include a processing circuit (e.g., processor, processing module, ASIC, etc.) 1602, a memory circuit (e.g., memory, memory device, memory module, etc.) 1604, and/or a communications interface 1606 that may all be communicatively coupled to one another, for example, via a communications bus 1608.

The processing circuit 1602 may perform data processing including execution of processor readable process steps, such as any of the steps operational at the central node described herein and illustrated in the figures. For example, the processing circuit 1602 may be a specialized processor (e.g., ASIC) that is adapted to perform at least steps 1702-1706 shown in FIG. 17. The memory circuit 1604 is adapted to store data, including but not limited to, storing a list of uncompromised group nodes, and a list of client nodes along with the their associated shared secret keys $K_M$. The communications interface 1606 is adapted to communicatively couple the central node 106 to the group node 104. The communications interface may be either wireless or a wireline connection.

Figure 17:
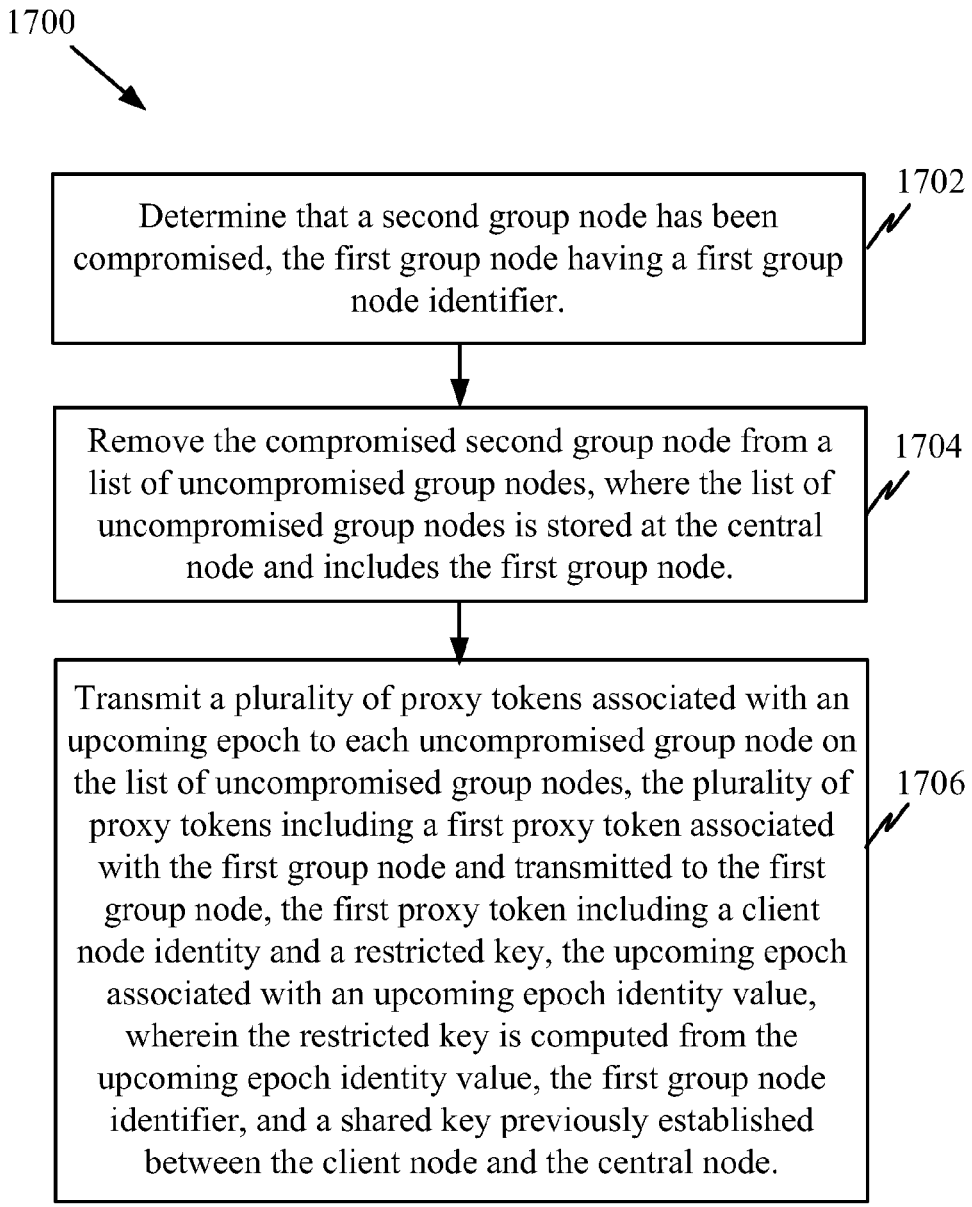
FIG. 17 illustrates a flowchart demonstrating an exemplary method operational at a central node for establishing a communication session between a first group node and a client node.

Exemplary Operation of Central Node for Establishing a Communication Session Between a Group Node and a Client Node FIG. 17 illustrates a flowchart 1700 demonstrating an exemplary method operational at a central node for establishing a communication session between a first group node and a client node. First, the central node may determine that a second group node has been compromised, where the first group node has a first group node identifier 1702. Next, the central node may remove the compromised second group node from a list of uncompromised group nodes, where the list of uncompromised group nodes is stored at the central node and includes the first group node 1704. Next, the central node may transmit a plurality of proxy tokens associated with an upcoming epoch to each uncompromised group node on the list of uncompromised group nodes. The plurality of proxy tokens includes a first proxy token associated with the first group node and is transmitted to the first group node, where the first proxy token includes a client node identity and a restricted key. The upcoming epoch is associated with an upcoming epoch identity value, and the restricted key is computed from the upcoming epoch identity value, the first group node identifier, and a shared key previously established between the client node and the central node 1706.

In one embodiment, the proxy token may be transmitted prior to the beginning of the upcoming epoch. In another embodiment, the central node may transmit a commit message to the first group node, the commit message indicating a start of the upcoming epoch.

Exemplary Operation of Central Node Using Real Time to Define Epochs

Figure 18:
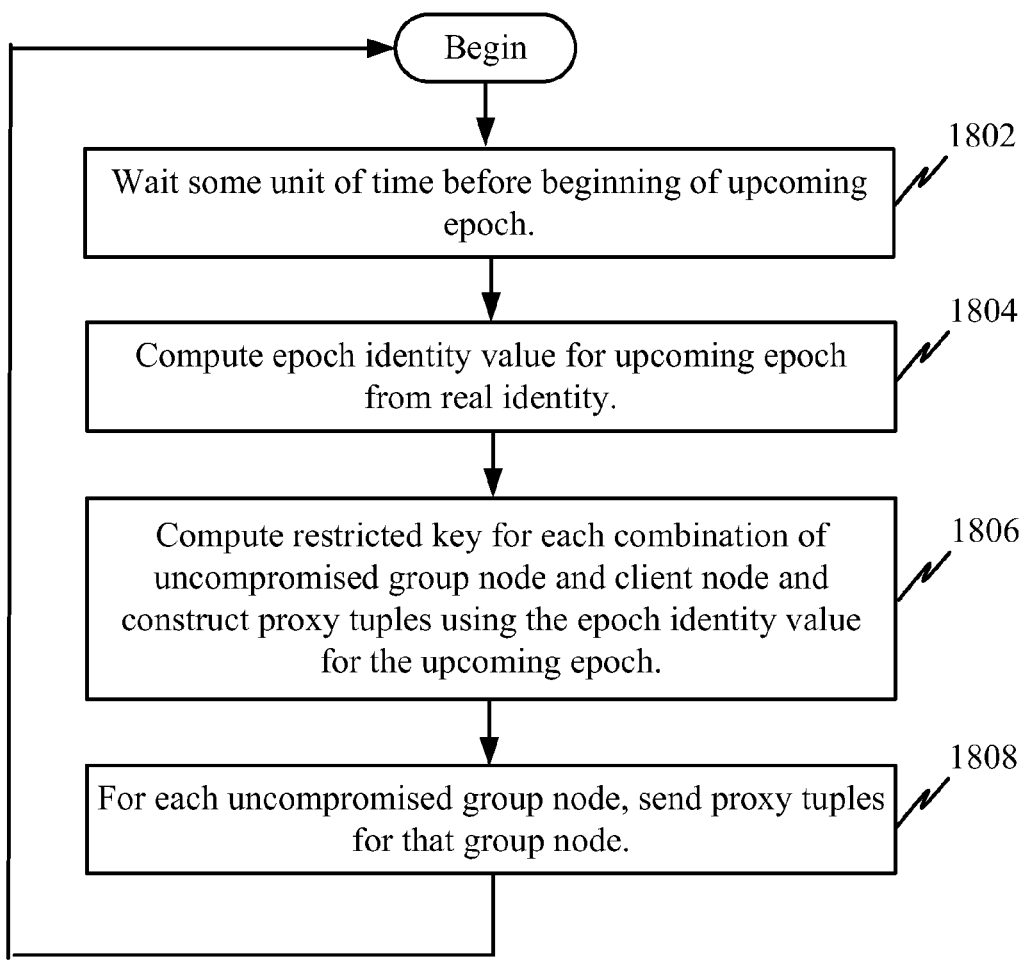
FIG. 18 illustrates an example of the operation of the central node for establishing a communication session between a group node and a client node using real time to define epochs.

FIG. 18 illustrates an example of the operation of the central node for establishing a communication session between a group node and a client node using real time to define epochs. The central node may wait until a predetermined time before the beginning of an upcoming epoch 1802. It may then compute the epoch identity value for the upcoming epoch 1804. Next, the central node may compute the restricted key $K_R$ for each combination of uncompromised group node and client node, and construct proxy tuples using the epoch identity value for the upcoming epoch 1806. For each uncompromised group node, the central node may send proxy tuples for that group node 1808.

For example, the central node may calculate a restricted key $K_R$ for a particular group node and client node combination by the following formula:

$$K_R = \text{CMAC}(K_M, \text{Gnode\_ID} \| \text{Epoch\_ID})$$

where Gnode_ID may be the group node identity, Epoch_ID may be the upcoming epoch value, $K_M$ may be the shared secret key shared between the client node and central node, and CMAC may be the Cipher-based message authentication code (CMAC) algorithm.

In another example, the central node may transmit a proxy token for an epoch to group nodes in a communication system, the proxy token having a client node identity and a restricted key, wherein the restricted key is computed from the epoch identity value Epoch_ID, the group node identity Gnode_ID, and a shared secret key $K_M$ previously established between the client node and the central node. The epoch identity value may be calculated from the real time. It may then be determined if a group node has been decommissioned, compromised, lost, stolen, or become faulty. If it is determined that a group node has been compromised, the compromised group node may be removed from a list of uncompromised group nodes stored on the central node. The central node may then terminate transmission of proxy tokens to the compromised group node and transmit a proxy token for an epoch to uncompromised group nodes, elements of the list of uncompromised group nodes, in a communication system, the proxy token having a client node identity and a restricted key, wherein the restricted key is computed from the identity of the upcoming epoch, the identity of the group node, and a shared key previously established between the client node and the central node.

Exemplary Operation of Central Node not Using Real Time to Define Epochs

Figure 19:
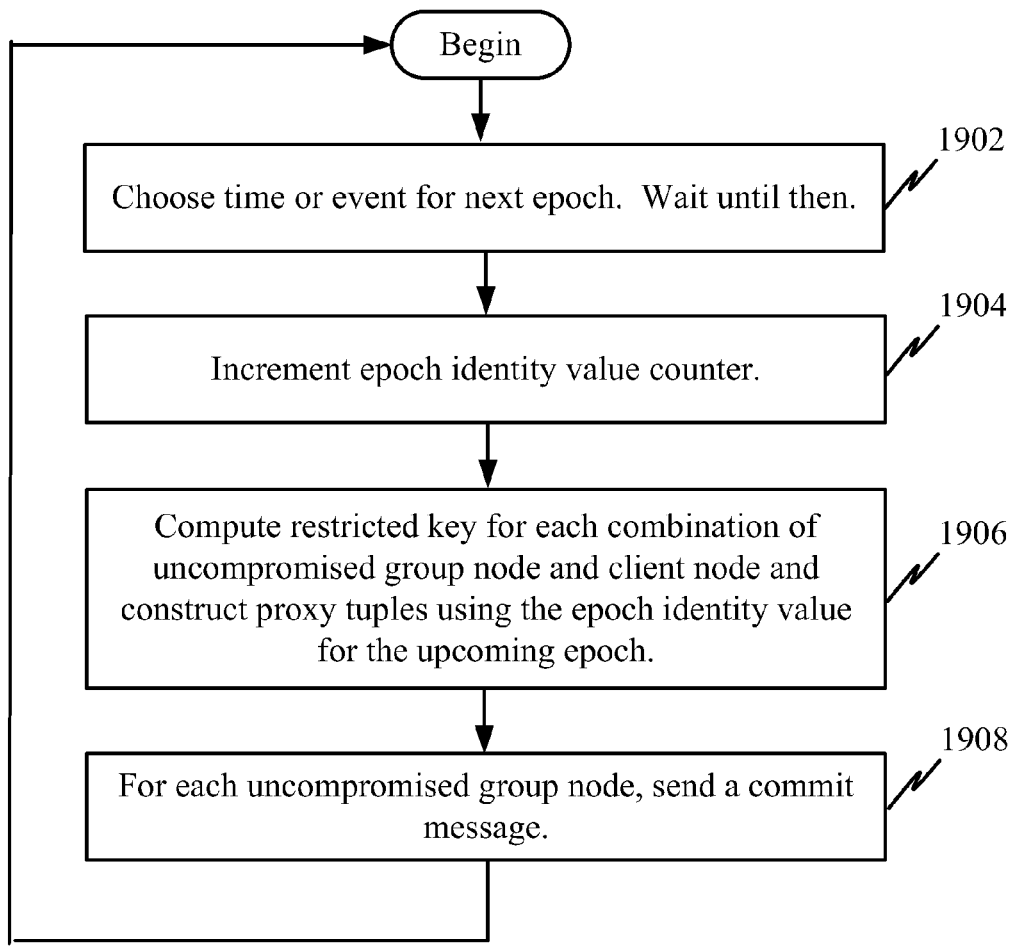
FIG. 19 illustrates an example of the operation of the central node for establishing a communication session between a group node and a client node wherein the epoch identity is not related to real time.

FIG. 19 illustrates an example of the operation of the central node for establishing a communication session between a group node and a client node wherein the epoch identity is not related to real time. The central node may choose a time or event for the next epoch and then wait for that time or event to occur 1902. Once it occurs, the epoch identity value counter may be incremented 1904. Next, the central node may compute the restricted key $K_R$ for each combination of uncompromised group node and client node and construct proxy tuples using the epoch identity for the upcoming epoch 1906. For each uncompromised group node, a commit message may be sent, the commit message indicating a start of the epoch 1908.

For example, the central node may calculate a restricted key $K_R$ for a particular group node and client node combination by the following formula:

$$K_R = \text{CMAC}(K_M, \text{Gnode\_ID} \| \text{Epoch\_ID})$$

where Gnode_ID may be the group node identity, Epoch_ID may be a value associated with the upcoming epoch, $K_M$ may be the shared secret key shared between the client node and central node, and CMAC may be the Cipher-based message authentication code (CMAC) algorithm.

In another example of the operation of the central node for establishing a communication session between a group node and a client node wherein the epoch identity is not related to real time, the central node may use a virtual pairing protocol with new client nodes joining the system.

A determination may be made if a group node has been compromised, lost, stolen, become faulty, or is to be removed for administrative reasons. If a compromised group node has been found, the compromised group node may be removed from a list of uncompromised group nodes stored on the central node. The central node may then terminate transmission of proxy tokens to the compromised group node and transmit a proxy token for an epoch to each uncompromised group node in a communication system, the uncompromised nodes taken from the list of uncompromised nodes, the proxy token having a client node identity and a restricted key, wherein the restricted key is computed from the identity of the upcoming epoch, the identity of the group node, and a shared key previously established between the client node and the central node. A commit message may then be sent to the group node, the commit message indicating a start of the epoch.

However, if a group node has not been compromised, a determination may be made as to whether a new epoch is to be started. If a new epoch is to be started, a new proxy token for each client node may be sent to the group node and a new commit message indicating the new epoch has begun, as well as an indication to discard old proxy tokens, may be sent to the group node. When the central node is about to initiate a new epoch, it may increment the epoch identity value counter.

One or more of the components, steps, features and/or functions illustrated in FIGS. 1, 2, 3, 4, 5, 6, 7, 8, 9, 10, 11, 12, 13, 14, 15, 16, 17, 18, and/or 19, may be rearranged and/or combined into a single component, step, feature or function or embodied in several components, steps, or functions. Additional elements, components, steps, and/or functions may also be added without departing from the invention. The apparatus, devices, and/or components illustrated in FIGS. 1, 5, 10, and/or 16 may be configured to perform one or more of the methods, features, or steps described in FIGS. 2, 3, 4, 6, 7, 8, 9, 11, 12, 13, 14, 15, 17, 18, and/or 19. The algorithms described herein may also be efficiently implemented in software and/or embedded in hardware.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices and/or other machine-readable mediums and, processor-readable mediums, and/or computer-readable mediums for storing information. The terms "machine-readable medium", "computer-readable medium", and/or "processor-readable medium" may include, but are not limited to non-transitory mediums such as portable or fixed storage devices, optical storage devices, and various other mediums capable of storing, containing or carrying instruction(s) and/or data. Thus, the various methods described herein may be fully or partially implemented by instructions and/or data that may be stored in a "machine-readable medium", "computer-readable medium", and/or "processor-readable medium" and executed by one or more processors, machines and/or devices.

Furthermore, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A method operational at a client node for establishing a session key between the client node and a group node, the method comprising:
    obtaining an epoch identity value associated with a current epoch by (a) negotiating an epoch identity value with the group node based on an exchange of epoch identity value information with the group node if the client node has no reliable time clock and (b) obtaining the epoch identity value from a node time value if a group node time value is within a predetermined time threshold of a client node time value;
    computing a restricted key using a shared secret key, the epoch identity value, and a group node identity value associated with the group node, the shared secret key known to the client node and a central node but unknown to the group node; and executing a session key establishment protocol with the group node to derive the session key using the restricted key as a master key in the session key establishment protocol.

2. The method of claim 1, further comprising:
synchronizing time between the client node, the group node, and the central node within a maximum time threshold difference of the client node real time, and wherein obtaining the epoch identity value associated with the current epoch includes
receiving a group node real time and the group node identity from the group node,
comparing the group node real time with a client node real time to determine whether the group node real time is within the maximum time threshold difference of the client node real time, and
computing the epoch identity value from the node real time if the group node real time is within the maximum time threshold difference.

3. The method of claim 2, wherein synchronizing time between the client node, the group node, and the central node is performed using loose clock synchronization.

4. The method of claim 1, wherein obtaining the epoch identity value associated with the current epoch includes:
receiving a group node epoch value and the group node identity from the group node;
computing the epoch identity value as the larger of the group node epoch value and a client node epoch value that is equal to a last known epoch identity value used in a last successfully established session with any group node; and
transmitting the computed epoch identity value to the group node.

5. The method of claim 1, wherein obtaining the epoch identity value associated with the current epoch includes:
transmitting a client node epoch value to the group node, the client node epoch value equal to a last known epoch identity value used in a last successfully established session with any group node;
receiving the epoch identity value and the group node identity from the group node; and
verifying that the received epoch identity value is equal to or greater than the client node epoch value transmitted.

6. The method of claim 1, wherein a communications link between the group node and the central node is only intermittently available during the current epoch.

7. The method of claim 1, wherein the restricted key is epoch specific.

8. The method of claim 7, wherein the restricted key is group node specific.

9. The method of claim 1, wherein the restricted key is provided to the group node by the central node.

10. The method of claim 1, wherein the restricted key is used multiple times during the current epoch to derive a plurality of session keys.

11. The method of claim 1, wherein the current epoch is of an unfixed duration and expires upon the start of a new epoch.

12. The method of claim 1, wherein the central node indicates a start of the current epoch by transmitting a commit message to the group node.

13. The method of claim 1, wherein computing the restricted key using the shared secret key, the epoch identity value, and the group node identity is performed using one of a cipher-based message authentication code (CMAC) function, a hash-based message authentication code (HMAC) function, or a cipher block chaining message authentication code (CBC-MAC) function.

14. The method of claim 1, further comprising:
inserting a tuple into a cache to avoid derivation of the restricted key for each session created with the group node during the current epoch.

15. The method of claim 1, wherein obtaining the epoch identity value comprises receiving an epoch identity value associated with a maximum epoch value of the group node.

16. The method of claim 1, further including flushing a cache of the client node and replacing cache values with a tuple based on the epoch identity value, a group node identifier, and the restricted key, if the epoch identity value is greater than the client node epoch value.

17. The method of claim 1, wherein obtaining an epoch identity value associated with a current epoch includes negotiating the epoch identity value with the group node based, at least in part, on a last known epoch identity value used in a last successfully established session with any group node.

18. The method of claim 17, wherein obtaining an epoch identity value associated with a current epoch is based on all prior successful session key establishment operations with all group nodes.

19. A client node, comprising:
a communication interface adapted to communicate with a group node; and
a processing circuit communicatively coupled to the communication interface, the processing circuit adapted to
obtain an epoch identity value associated with a current epoch wherein the processing circuit is further adapted to (a) negotiate an epoch identity value with the group node based on an exchange of epoch identity value information with the group node if the client node has no reliable time clock and (b) obtain the epoch identity value from a node time value if a group node time value is within a predetermined time threshold of a client node time value,
compute a restricted key using a shared secret key, the epoch identity value, and a group node identity associated with the group node, the shared secret key known to the client node and a central node but unknown to the group node, and
execute a session key establishment protocol with the group node to derive a session key using the restricted key as a master key in the session key establishment protocol.

20. The client node of claim 19, wherein the processing circuit is further adapted to synchronize time between the client node, the group node, and the central node within a maximum time threshold difference of the client node real time but not more precisely, and wherein said obtain the epoch identity value associated with the current epoch causes the processing circuit to:
receive a group node real time and the group node identity from the group node;
compare the group node real time with a client node real time to determine that the group node real time is within the maximum time threshold difference of the client node real time; and
compute the epoch identity value from the node real time if the group node real time is within the maximum time threshold difference.

21. The client node of claim 20, wherein the processing circuit is adapted to synchronize time between the client node, the group node, and the central node using loose clock synchronization.

22. The client node of claim 19, wherein obtaining the epoch identity value associated with the current epoch causes the processing circuit to:
receive a group node epoch value and the group node identity from the group node;
compute the epoch identity value as the larger of the group node epoch value and a client node epoch value that is equal to a last known epoch identity value used in a last successfully established session with any group node; and
transmit the computed epoch identity value to the group node.

23. The client node of claim 19, wherein obtaining the epoch identity value associated with the current epoch causes the processing circuit to:
transmit a client node epoch value to the group node, the client node epoch value equal to a last known epoch identity value used in a last successfully established session with any group node;
receive the epoch identity value and the group node identity from the group node; and
verify that the received epoch identity value is equal to or greater than the client node epoch value transmitted.

24. A client node, comprising:
means for obtaining an epoch identity value associated with a current epoch by (a) negotiating an epoch identity value with the group node based on an exchange of epoch identity value information with the group node if the client node has no reliable time clock and (b) obtaining the epoch identity value from a node time value if a group node time value is within a predetermined time threshold of a client node time value;
means for computing a restricted key using a shared secret key, the epoch identity value, and a group node identity associated with a group node, the shared secret key known to the client node and a central node but unknown to the group node; and
means for executing a session key establishment protocol with the group node to derive a session key using the restricted key as a master key in the session key establishment protocol.

25. A non-transitory processor readable storage medium having one or more instructions operational at a client node for establishing a session key between the client node and a group node, which when executed by at least one processor causes the processor to:
obtain an epoch identity value associated with a current epoch, wherein obtaining the epoch identity value by (a) negotiating an epoch identity value with the group node based on an exchange of epoch identity value information with the group node if the client node has no reliable time clock and (b) obtaining the epoch identity value from a node time value if a group node time value is within a predetermined time threshold of a client node time value;
compute a restricted key using a shared secret key, the epoch identity value, and a group node identity associated with the group node, the shared secret key known to the client node and a central node but unknown to the group node; and
execute a session key establishment protocol with the group node to derive the session key using the restricted key as a master key in the session key establishment protocol.

26. The non-transitory processor readable storage medium of claim 25, having additional instructions which when executed by the processor further causes the processor to:
synchronize time between the client node, the group node, and the central node within a maximum time threshold difference of the client node real time, and wherein obtaining the epoch identity value associated with the current epoch includes
receiving a group node real time and the group node identity from the group node,
comparing the group node real time with a client node real time to determine whether that the group node real time is within the maximum time threshold difference of the client node real time, and
computing the epoch identity value from the node real time if the group node real time is within the maximum time threshold difference.

27. The non-transitory processor readable storage medium of claim 26, wherein the additional instructions further cause the processor to synchronize time between the client node, the group node, and the central node using loose clock synchronization.

28. The non-transitory processor readable storage medium of claim 25, wherein obtaining the epoch identity value associated with the current epoch includes:
receiving a group node epoch value and the group node identity from the group node;
computing the epoch identity value as the larger of the group node epoch value and a client node epoch value that is equal to a last known epoch identity value used in a last successfully established session with any group node; and
transmitting the computed epoch identity value to the group node.

29. The non-transitory processor readable storage medium of claim 25, wherein obtaining the epoch identity value associated with the current epoch includes:
transmitting a client node epoch value to the group node, the client node epoch value equal to a last known epoch identity value used in a last successfully established session with any group node;
receiving the epoch identity value and the group node identity from the group node; and
verifying that the received epoch identity value is equal to or greater than the client node epoch value transmitted.

30. A method operational at a group node for establishing a session key between the group node and a client node, the method comprising:
obtaining an epoch identity value associated with a current epoch by (a) negotiating an epoch identity value with the client node based on an exchange of epoch identity value information with the client node if the client node has no reliable time clock and (b) obtaining the epoch identity value from a node time value if a group node time value is within a predetermined time threshold of a client node time value;
retrieving a restricted key based on the epoch identity value;
receiving a first set of proxy tokens associated with the epoch from a central node, the first set of proxy tokens including a proxy token associated with the client node, the proxy token including a client node identity and the restricted key;

storing the first set of proxy tokens as a reserve set of proxy tokens;

replacing an active set of proxy tokens with the reserve set of proxy tokens upon a beginning of the epoch, the reserve set of proxy tokens becoming a next active set of proxy tokens; and executing a session key establishment protocol with the client node to derive the session key using the restricted key as a master key in the session key establishment protocol.

31. The method of claim 30, wherein obtaining the epoch identity value associated with the epoch includes:

receiving a client node real time;

comparing the client node real time to a group node real time to determine whether the group node real time is within a maximum time threshold difference of the client node real time; and computing the epoch identity value based, at least in part, on a node real time if the group node real time is within the maximum time threshold difference.

32. The method of claim 30, wherein retrieving the restricted key based on the epoch identity value further includes:

determining whether the reserve set of proxy tokens or the active set of proxy tokens corresponds to the epoch identity value;

obtaining the restricted key from the reserve set of proxy tokens if the reserve set of proxy tokens are associated with the epoch identity value; and obtaining the restricted key from the set of proxy tokens if the reserve set of proxy tokens are associated with the epoch identity value.

33. The method of claim 30, further comprising:

synchronizing time between the central node, the group node, and the client node within a maximum time threshold difference of the client node real time but not more precisely;

obtaining an epoch identity value associated with a current time; and selecting the restricted key for the client node from the first set of proxy tokens based on the epoch identity value and the client node identity.

34. The method of claim 33, wherein synchronizing time between the client node, the group node, and the central node is performed using loose clock synchronization.

35. The method of claim 30, further comprising:

receiving at least one message from the central node that includes an epoch identity value associated with the epoch, and the first set of proxy tokens; and receiving a commit message from the central node indicating the beginning of the epoch.

36. The method of claim 30, wherein a communications link between the group node and the central node is only intermittently available during the epoch.

37. The method of claim 30, wherein the first set of proxy tokens associated with the epoch is received before a beginning of the epoch.

38. The method of claim 30, wherein the session key is established without communication with a central node.

39. The method of claim 30, wherein obtaining an epoch identity value associated with a current epoch includes negotiating the epoch identity value with the client node based, at least in part, on a last known epoch identity value used in a last successfully established session with any group node.

40. A group node, comprising:

a first communication interface adapted to communicate with a central node;

a second communication interface adapted to communication with a client node; and a processing circuit communicatively coupled to the first and second communication interfaces, the processing circuit adapted to obtain an epoch identity value associated with an epoch using wherein the processing circuit is further adapted to (a) negotiate an epoch identity value with the client node based on an exchange of epoch identity value information with the client node if the client node has no reliable time clock and (b) obtain the epoch identity value from a node time value if a group node time value is within a predetermined time threshold of a client node time value;

retrieve a restricted key based on the epoch identity value;

receive a first set of proxy tokens associated with the epoch from the central node, the first set of proxy tokens including a proxy token associated with the client node, the proxy token including a client node identity and the restricted key, store the first set of proxy tokens as a reserve set of proxy tokens, replace an active set of proxy tokens with the reserve set of proxy tokens upon a beginning of the epoch, the reserve set of proxy tokens becoming a next active set of proxy tokens, and execute a session key establishment protocol with the client node to derive a session key using the restricted key as a master key in the session key establishment protocol.

41. A group node, comprising:

means for obtaining an epoch identity value associated with an epoch by (a) negotiating an epoch identity value with the client node based on an exchange of epoch identity value information with the client node if the client node has no reliable time clock and (b) obtaining the epoch identity value from a node time value if a group node time value is within a predetermined time threshold of a client node time value;

means for retrieving a restricted key based on the epoch identity value;

means for receiving a first set of proxy tokens associated with the epoch from a central node, the first set of proxy tokens including a proxy token associated with a client node, the proxy token including a client node identity and the restricted key;

means for storing the first set of proxy tokens as a reserve set of proxy tokens;

means for replacing an active set of proxy tokens with the reserve set of proxy tokens upon a beginning of the epoch, the reserve set of proxy tokens becoming a next active set of proxy tokens; and means for executing a session key establishment protocol with the client node to derive a session key using the restricted key as a master key in the session key establishment protocol.

42. A non-transitory processor readable storage medium having one or more instructions operational at a group node for establishing a session key between the group node and a client node, which when executed by at least one processor causes the processor to:
- obtain an epoch identity value associated with an epoch by (a) negotiating an epoch identity value with the client node based on an exchange of epoch identity value information with the client node if the client node has no reliable time clock and (b) obtaining the epoch identity value from a node time value if a group node time value is within a predetermined time threshold of a client node time value;
- retrieve a restricted key based on the epoch identity value;
- receive a first set of proxy tokens associated with the epoch from a central node, the first set of proxy tokens including a proxy token associated with the client node, the proxy token including a client node identity and the restricted key;
- store the first set of proxy tokens as a reserve set of proxy tokens;
- replace an active set of proxy tokens with the reserve set of proxy tokens upon a beginning of the epoch, the reserve set of proxy tokens becoming a next active set of proxy tokens; and
- execute a session key establishment protocol with the client node to derive the session key using the restricted key as a master key in the session key establishment protocol.

43. A method operational at a central node for establishing a communication session between a first group node and a client node, the method comprising:
- determining that a second group node has been compromised, the first group node having a first group node identifier;
- removing the compromised second group node from a list of uncompromised group nodes, wherein the list of uncompromised group nodes is stored at the central node and includes the first group node; and
- transmitting a plurality of proxy tokens associated with an upcoming epoch to each uncompromised group node on the list of uncompromised group nodes, the plurality of proxy tokens including a first proxy token associated with the first group node and transmitted to the first group node, the first proxy token including a client node identity and a restricted key, the upcoming epoch associated with an upcoming epoch identity value, the upcoming epoch identity value obtained by (a) negotiating an epoch identity value based on an exchange of epoch identity value information between the client node and the first group node if the client node has no reliable time clock and (b) obtaining the epoch identity value from a node time value if a group node time value is within a predetermined time threshold of a client node time value, wherein the restricted key is computed from the upcoming epoch identity value, the first group node identifier, and a shared key previously established between the client node and the central node but unknown to the group node.

44. The method of claim 43, wherein the first proxy token is transmitted prior to a beginning of the upcoming epoch.

45. The method of claim 44, further comprising:
- transmitting a commit message to the first group node, the commit message indicating the beginning of the upcoming epoch.

46. The method of claim 43, wherein obtaining an epoch identity value associated with a current epoch includes negotiating the epoch identity value between the client node and the group node based, at least in part, on a last known epoch identity value used in a last successfully established session with any group node.

47. The method of claim 46, wherein obtaining an epoch identity value associated with a current epoch is based on all prior successful session key establishment operations with all group nodes.

48. A central node for establishing a communication session between a first group node and a client node, the central node comprising:
- a communication interface adapted to communicate with the first group node; and
- a processing circuit coupled to the communication interface and adapted to
  - determine that a second group node has been compromised, the first group node having a first group node identifier,
  - remove the compromised second group node from a list of uncompromised group nodes, wherein the list of uncompromised group nodes is stored at the central node and includes the first group node, and
  - transmit a plurality of proxy tokens associated with an upcoming epoch to each uncompromised group node on the list of uncompromised group nodes, the plurality of proxy tokens including a first proxy token associated with the first group node and transmitted to the first group node, the first proxy token including a client node identity and a restricted key, the upcoming epoch associated with an upcoming epoch identity value, the upcoming epoch identity value obtained by (a) negotiating an epoch identity value based on an exchange of epoch identity value information between the client node and the first group node if the client node has no reliable time clock and (b) obtaining the epoch identity value from a node time value if a group node time value is within a predetermined time threshold of a client node time value, wherein the restricted key is computed from the upcoming epoch identity value, the first group node identifier, and a shared key previously established between the client node and the central node but unknown to the group node.

49. A non-transitory processor storage medium having one or more instructions operational at a central node for establishing a communication session between a first group node and a client node, which when executed by at least one processor causes the processor to:
- determine that a second group node has been compromised, the first group node having a first group node identifier;
- remove the compromised second group node from a list of uncompromised group nodes, wherein the list of uncompromised group nodes is stored at the central node and includes the first group node; and
- transmit a plurality of proxy tokens associated with an upcoming epoch to each uncompromised group node on the list of uncompromised group nodes, the plurality of proxy tokens including a first proxy token associated with the first group node and transmitted to the first group node, the first proxy token including a client node identity and a restricted key, the upcoming epoch associated with an upcoming epoch identity value, the upcoming epoch identity value obtained by (a) negotiating an epoch identity value based on an exchange of epoch identity value information between the client node and the first group node if the client node has no reliable time clock and (b) obtaining the epoch identity value from a node time value if a group node time value is within a predetermined time threshold of a client node time value, wherein the restricted key is computed from the upcoming epoch identity value, the first group node identifier, and a shared key previously established between the client node and the central node but unknown to the group node.

50. The method of claim 39, wherein obtaining an epoch identity value associated with a current epoch is based on all prior successful session key establishment operations with all group nodes.

* * * * *